United States Patent
Rutherglen et al.

(10) Patent No.: US 7,428,752 B2
(45) Date of Patent: Sep. 23, 2008

(54) SECURE DATA ACCESSING SYSTEM AND METHOD

(75) Inventors: Jason John Rutherglen, San Francisco, CA (US); Sunil Reddy Palacherla, Belmont, CA (US); Anthony Travis Sziklai, Half Moon Bay, CA (US); David John Stanley, Los Altos Hills, CA (US)

(73) Assignee: Applications in Internet Time, LLC, Half Moon Bay, CA (US)

(*) Notice: Subject to any disclaimer, the term of this patent is extended or adjusted under 35 U.S.C. 154(b) by 1084 days.

(21) Appl. No.: 09/872,502

(22) Filed: Jun. 1, 2001

(65) Prior Publication Data

US 2003/0033517 A1 Feb. 13, 2003

(51) Int. Cl.
*H04L 9/00* (2006.01)

(52) U.S. Cl. .............. 726/12; 726/26; 726/30; 713/151; 713/153; 709/203; 709/219; 709/239

(58) Field of Classification Search ............... 713/153; 726/12
See application file for complete search history.

(56) References Cited

U.S. PATENT DOCUMENTS

| | | | | | |
|---|---|---|---|---|---|
| 6,006,230 | A | * | 12/1999 | Ludwig et al. | 707/10 |
| 6,049,673 | A | * | 4/2000 | McComb et al. | 717/164 |
| 6,125,383 | A | * | 9/2000 | Glynias et al. | 709/202 |
| 6,226,637 | B1 | * | 5/2001 | Carey et al. | 707/4 |
| 6,269,373 | B1 | * | 7/2001 | Apte et al. | 707/10 |
| 6,377,993 | B1 | * | 4/2002 | Brandt et al. | 709/227 |
| 6,438,559 | B1 | * | 8/2002 | White et al. | 707/103 R |
| 6,490,620 | B1 | * | 12/2002 | Ditmer et al. | 709/224 |
| 6,604,046 | B1 | * | 8/2003 | Van Watermulen et al. | 701/208 |
| 6,631,402 | B1 | * | 10/2003 | Devine et al. | 709/217 |
| 6,658,453 | B1 | * | 12/2003 | Dattatri | 709/202 |
| 6,687,831 | B1 | * | 2/2004 | Albaugh et al. | 726/7 |
| 6,721,777 | B1 | * | 4/2004 | Sharma | 718/101 |
| 2001/0047394 | A1 | * | 11/2001 | Kloba et al. | 709/217 |
| 2002/0065946 | A1 | * | 5/2002 | Narayan | 709/315 |
| 2003/0050932 | A1 | * | 3/2003 | Pace et al. | 707/100 |

OTHER PUBLICATIONS

PrismTech, 'Firewall Security for Corba and J2ee/EJB with the IIOP Domain Boundary Controller', PrismTech, 2004-2007, Xtradyne White Paper, entire document, http://www.xtradyne.com/documents/whitepapers/Xtradyne-I-DBC-WhitePaper.pdf.*

(Continued)

*Primary Examiner*—Kristine Kincaid
*Assistant Examiner*—Ronald Baum
(74) *Attorney, Agent, or Firm*—Ladas & Parry LLP

(57) ABSTRACT

A system and method for accessing data located behind a security mechanism is provided. In the preferred embodiment, the system may use the common HTTP protocol and JDBC drivers. In more detail, a client may execute a Java applet that generates database proxy objects that are communicated to an application server using the HTTP protocol. The application server may use a servlet to process the objects and generate database requests using JDBC drivers so that the data is retrieved from the database for the client Java applet without the security problems.

38 Claims, 5 Drawing Sheets

OTHER PUBLICATIONS

"FAQ - Security", Last updated: Aug. 20, 1998; IDS Software FAQ-Security, http://web.archive.org/web/1991127140509/www.idssoftware.com/faq-s.html, pp. 1-2.

"What is IDS Server", Last updated: Jun. 18, 1998, IDS Software http://web.archive.org/web/2000619165218/http:/www.idssoftware.com/idsserver.html, pp. 1-2.

* cited by examiner

SECURE DATA ACCESSING SYSTEM AND METHOD

FIELD OF THE INVENTION

The invention relates generally to a system for accessing a computer and its database and in particular to a system and method for accessing data, such as in a database, that is protected by/located behind a typical computer security system, such as a typical firewall.

APPENDICES

The present application includes several Appendices that are incorporated into the disclosure and are part of the disclosure. Appendix A is 47 pages long and contains the source code of the various Java classes located on the client computer that are used to implement one embodiment of the invention. Appendix B is 8 pages long and contains the source code of the various Java classes shared by the client computer and application server computer that are used to implement one embodiment of the invention. Appendix C is 19 pages long and contains the source code of the various Java classes located on the application server that are used to implement one embodiment of the invention.

BACKGROUND OF THE INVENTION

Modernly, computer systems are being put into place wherein the software and data on which the computer operates may be located at one or more disparate computer resource locations. In addition, the databases being accessed by the software may be located on a different computing resource and may be, for example, located on a corporate intranet so that the resources to implement and execute the software are distributed. To accomplish this distributed software execution, it is necessary to be able to track the locations of the various resources on the Internet, such as by the IP addresses, so that the software resources and the data from one or more databases can be retrieved as needed. For example, pieces of the software code may be located at one location while the data associated with the software code may be distributed across the Internet.

The problem with the distributed computing set forth above is that the computer network of most corporate users is behind a security device or system, such as a firewall, and/or subject to proxy servers and other security measures that prevent users from easily accessing databases outside of the firewall. The purpose of the firewall is to protect the computer network from hackers outside of the system trying to get into the computer network and to avoid a user behind the firewall from downloading a potentially dangerous piece of code from the Internet. In addition, if the software is written in Java, the applet downloaded to the client can only interact with the server from which it was downloaded which is a fundamental security feature of Java. Thus, trying to connect through the Internet to distant servers cannot be done using Java applets with most protocols. The exception is the common hypertext transfer protocol (HTTP). By way of background, the HTTP protocol is the protocol used for all Internet traffic and it has over 10,000 ports. By specification, each port is traditionally used for certain types of traffic. For example, Oracle® database connections traditionally use port 1521. The general unprotected port for web-site Internet traffic, by default, is port 80. In addition, secure HTTP protocol traffic (HTTPS) is typically communicated over port 433.

In approaching this problem, there are well known typical approaches such as those described in the Sun Microsystems, Inc. Java 2.0 Enterprise Edition ("J2EE") specification. In particular, the application server would make the call to the database server and then the application server would obtain the results and create business objects on the application server itself. The objects would then be sent to the requesting client. In this mode of operation, the objects would be resident on the application server and would then be available for other clients to use if they so chose to do so. This has the benefit of not duplicating effort, because the application server would maintain the objects for all clients to use, and the client would transport the objects back as needed. While this may be efficient, it has certain disadvantages for a dynamic distributing computing environment, such as: (1) it requires that the applet downloaded to the client contain the classes necessary to create the intended objects; and (2) the server must install the same classes on itself for creating the business objects intended for the client. These disadvantages make the system much less dynamic, and create other problems. For example, different clients may create different objects from the same resultset that is returned from the database and the classes required to create the objects for all of the clients may not be available to the application server.

In more detail, the clients that need a database connection may not be able to connect to the server from behind secure corporate intranets. Since corporate intranets, in general, are secured with firewalls, proxies and other security measures, the clients will have to tunnel through them to gain access to the external resources. Furthermore, most firewalls do not allow direct Internet Protocol (IP) traffic between the Internet and the internal network they are protecting. Thus, most organizations behind firewalls have a proxy server running that allows people inside the organization to access the Web. For a distributed computing environment across the Internet, it is necessary to allow users to access multiple databases through these security measures. Thus, it is necessary to provide a system and method for accessing data from behind a corporate security system so that the distributed computing system can be efficiently operated and for permitting a user behind a firewall to execute a distributed computer application, and it is to this end that the present invention is directed.

SUMMARY OF THE INVENTION

The secure data accessing system and method in accordance with the invention overcomes the limitations associated with the typical systems. The secure data accessing system may be particularly useful for a distributed application/computing environment in which there is a need for extensive access to a variety of database servers. To accomplish the communication by tunneling through a security mechanism, such as a firewall, the well known HTTP protocol is used in combination with JDBC drivers. The JDBC drivers use a set of unique parameters for connecting to the database server. In addition, database servers, like all other servers, require the clients to connect to them through a particular port using client libraries and/or JDBC drivers. In particular, all JDBC drivers are required to conform to the JDBC API specifications developed by Sun Microsystems, Inc. Since all JDBC drivers are written to Java specifications, all of them must implement the JDBC interfaces.

In a distributed application environment that uses Java, the applet or the stand alone application needs to communicate with the database server. Java applets are only allowed to communicate with the server that the applet is originated/downloaded from due to security restrictions imposed by the Java language specification. In a distributed application environment, it is more likely that the database server might be on a different server than the application server and these servers might not be reachable by the client using protocols other than HTTP. In addition, JDBC drivers provided by the database vendors connect to the database using sockets. Furthermore, applets are restricted from making direct socket connections to other a servers for the same security concerns. Corporate intranets need to provide access to the Internet to their users and, by default or de facto standard, the HTTP protocol has become the preferred protocol. Therefore, the best way for the applets to communicate with the server in accordance with the invention would be to use the HTTP protocol in combination with JDBC drivers in order to be as compatible as possible with the proxy servers and network firewalls.

The HTTP JDBC driver system in accordance with the invention may also be used to solve a problem faced by systems that need to communicate with a database through a firewall, such as web services. The system may also be used effectively with other systems including peer-to-peer systems, in jini services, mobile devices with small footprints and any other usage that requires a thin client to obtain data from a data storage device through a firewall, a network address translator (NAT) or other security mechanism, in a dynamic powerful way. For example, a dynamic application system that may need to be connected to multiple databases that may be located behind security mechanisms such as the dynamic application system described at http://www.verticalsuite.com.

Unlike a more traditional approach using the J2EE specification (J2EE stands for Java 2.0 Enterprise Edition), the HTTP JDBC driver in accordance with the invention has significant advantages. Using the HTTP JDBC driver, the application server may create a result and sends that to the client who then creates the objects as needed at the client. The advantages to this approach become apparent in a dynamic, web-services type of environment in that it allows clients to be very thin, and to unilaterally determine the way in which they receive data. The client then has the power to dynamically determine how it wants the results presented or treated. For example, the client could choose to create its own business objects, or it could simply manipulate the data and/or present it to the user.

The HTTP JDBC driver system in accordance with the invention may affect/be beneficial to many different existing systems. For example, the driver system in accordance with the invention may be used to improve dynamic IP addresses. In particular, where the addresses or locations are dynamic or not known to the client computer, the HTTP connections could still be made with the results being sent back via HTTP. This aspect may be crucial to a web services type of environment. The change in the IP address or the location of the database server will not in anyway effect the client as long as the application server can connect and the database server is able to accept the connection. The change in the configuration of the database will not effect the HTTP-JDBC driver setup. For example, no additional classes are needed and no additional configuration for the application is required. The client only has to pass the right set of changed parameters for connecting which will be used by the application server to connect to the database.

The driver system may be used by intelligent agents to obtain database access. In addition, jini services are built using Java components and, therefore, this driver technology could be used in a jini services environment. The driver system in accordance with the invention may also benefit a distributed computing system. In particular, the technology would support distributed computing generally, across the Internet and through firewalls and other security mechanisms.

The HTTP JDBC driver system in accordance with the invention may also be used to enhance peer-to-peer systems. In particular, the driver technology may be critical in supporting peer-to-peer communications where a peer needs to go through a firewall to get data from a data storage device. In fact, in Project Jxta (http://www.Jxta.org), which is Sun Microsystems's peer-to-peer specification and platform, there are specific discussions about firewalls and network address translator's (NAT's) and the fact that you need one peer on the outside and one peer on the inside of the firewall, both being in the same peer group and able to transfer code and/or data. The driver system in accordance with the invention may also benefit N-tiered or multi-tiered architectures wherein, regardless of the number of "clients" and "servers" or the number of connections, the driver system can be used to transport data sets across firewalls as many times as may be required in a complex series of connections.

The HTTP JDBC driver system in accordance with the invention may be used with object-oriented databases and other new data storage devices. For example, the driver system will support any new data storage device, including existing types such as object-oriented databases (CloudScape), so long as the proper drivers exist which can be loaded onto the application server. This could become of critical importance in a web services environment, because the client would not be altered by the addition of new data storage devices or means. In addition, data could be pulled from such databases as PointBase.com (a Java relational database that has such a small footprint it can sit on a device, such as a router or vending machine).

The HTTP JDBC driver system in accordance with the invention may also be used with jini services or Web services. In an environment of the future built on jini services or web services, an application would be pulled together dynamically as components being assembled on the fly to create one-time applications. The driver system could act as a component to the services to provide dynamic access to external disparate data sources. Alternatively, the driver of this invention could be provided as its own service.

Thus, in accordance with the invention, a system for accessing data located behind a security mechanism is provided. The system comprises a client that executes a first application having a series of instructions that includes accessing data from a database wherein the client creates one or more database proxy objects that are used to indirectly access the database. The system further comprises an application server that executes a second application that interacts with the database and has one or more corresponding objects, the application server further comprising one or more drivers that interface with a database so that the application server requests data from the database. The system causes the client to interact with the database through the application server so that a security mechanism protecting the client does not interrupt the accessing of the data from the database.

The system comprises a client that executes a Java applet having a series of instructions to access data from a database and creates proxy objects in response to the database request. The system further comprises a Java application server that executes a servlet that receives the calls generated by the proxy objects on the client and further generates database calls using the JDBC drivers.

The application server further comprises a mechanism to send back the results and the unique name of the object, if a new object is created on the server, or the resultset created by the database call. Such a system comprised of the above-mentioned components will make it possible for the applet to communicate with the database through the application server with the help of proxy objects, and by doing so the security mechanism protecting the client does not interrupt the database access and the JDBC functionality is achieved.

In accordance with yet another aspect of the invention, a system for accessing data located behind a security mechanism is provided wherein the system comprises a client having means for creating one or more proxy objects in response to a database request. The system further comprises an application server comprising means for processing the calls received from the database proxy objects and means for using one or more drivers to generate one or more database requests based on the calls from the proxy objects wherein the client interacts with the database through the application server so that a security mechanism protecting the client does not interrupt the accessing of the data in the database.

In accordance with yet another aspect of the invention a system for accessing data by a Java applet wherein the data is located behind a security mechanism is provided. The system comprises a client that executes a Java applet having a series of instructions to access data from a database and creates proxy objects in response to the database request. The system further comprises a Java application server that executes a servlet that receives the calls generated by the proxy objects on the client and further generates database calls using the JDBC drivers. The application server further comprises a mechanism to send back the results along with a unique name of the object created by the database call, if any, or sends the resultset back to the client. Such a system comprised of the above-mentioned components will make it possible for the applet to communicate with the database through the application server so that a security mechanism protecting the client does not interrupt the database access.

DETAILED DESCRIPTION OF A PREFERRED EMBODIMENT

The invention is particularly applicable to a distributed application system that uses Java applets, the HTTP protocol and JDBC drivers and it is in this context that the invention will be described. It will be appreciated, however, that the system and method in accordance with the invention has greater utility, such as to other computing systems wherein users behind security mechanisms need to access external data or where users need to access data located behind a security mechanism. The invention may also be implemented with other protocols or with other programming languages without departing from the scope of the invention.

Figure 1:
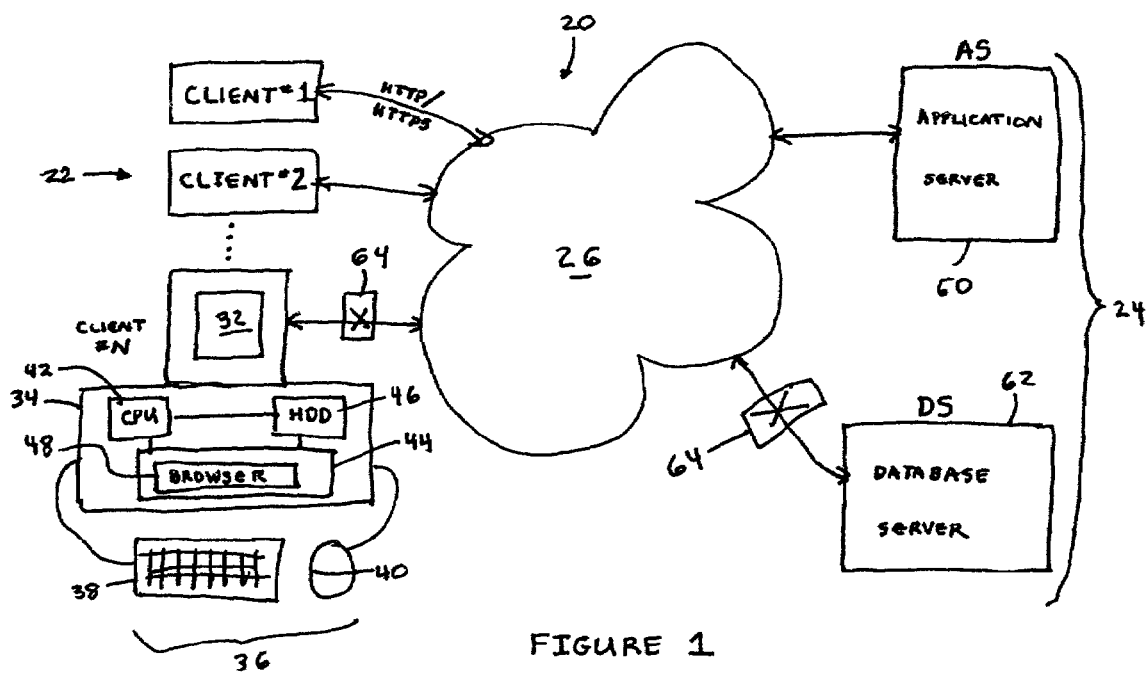
FIG. 1 is a block diagram illustrating a preferred embodiment of the secure data accessing system in accordance with the invention.

FIG. 1 is a block diagram illustrating a preferred embodiment of the secure data accessing system 20 in accordance with the invention. In more detail, the system may include one or more clients 22 (Client 1, Client 2, . . . , Client N), and a distributed computer application system 24. The various elements of the system, such as the clients 22 and the distributed computer application system 24 may be interconnected together by a communications network 26 that permits all of the elements of the system to communicate with each other using a communications protocol. In a preferred embodiment, the communications network may be a computer network and more preferably the Internet and the World Wide Web. In a preferred embodiment, the communications over the communications network may be carried out using a well known protocol, such as the hypertext transfer protocol (HTTP). It may also be carried out using a secure communications protocol such as the well known secure hypertext transfer protocol (HTTPS).

Each client 22 may permit an authorized user of the system (e.g., someone with the appropriate access privileges) to access the resources of the distributed computer application system 24 as will be described in more detail below. Each client 22 may comprise a typical computer system that may include a display device 32, such as a CRT or LCD, a computer chassis 34 and one or more input/output devices 36, such as a keyboard 38 and a mouse 40 as shown. Each client may also include an output device, such as a printer (not shown) for generating a hard copy of the results of the distributed computer application being executed in accordance with the invention. The reports may also be displayed on the display device 32. The computer chassis 34 may further include a central processing unit (CPU) 42 that controls the operation of the computer system, a temporary memory 44, such as DRAM or SRAM, that stores one or more pieces of software, such as the operating system, that are being currently executed by the CPU and a persistent storage device 46, such as a hard disk drive, optical disk drive, tape drive or the like, that permanently stores data and software. In order to access the distributed computer application system in accordance with the invention, a browser application 48 may be loaded from the persistent storage device into the memory as shown and executed by the CPU. The browser application, as is well known, permits the computer to connect to and communicate over the Internet 26 with other computer systems, such as the central computer application system 24. For example, the browser may communicate using a typical protocol, such as the well known HTTP protocol or the HTTPS secure protocol as described above. In general, the browser initiates a communications connection with the computer system and then establishes the protocol. In the preferred embodiment, the browser 48 permits a user of the client system 22 to access the system, execute one or more distributed applications using the distributed computer application system and receive output from the distributed applications. Typically, the browser may display a series of user interface screens, such as web pages, that permit the user to interact with the distributed computer application system. In a preferred embodiment, the client must have, at a minimum, the Java runtime environment which typically includes the ability to download applets, to create resultset objects, and to communicate over the http protocol, among other things.

The distributed computer application system 24 may be one or more typical server computer systems in the preferred embodiment wherein the one or more servers are interconnected together and communicate with each other over the communications network 26. In this manner, the combination of servers required to generate a distributed software application may be dispersed from each other and, when necessary, connect to each other and transfer data between each other using the communications network. In the example shown, the distributed computer application system may include an application server 60 and a database server 62. In operation, a Java applet may be downloaded from the application server to the client so that it can be executed by the client. The applet may generate requests that are communicated to the database server over the Internet to connect to and retrieve the data from different databases. In a preferred embodiment, the applet to be downloaded to the client should contain the HTTP-JDBC client classes (See Appendix A and the description below) and the common classes shared by both the server and client (See Appendix B and the description below). To accomplish this, the system may include a routing database that maintains the properties (e.g., URLs) of the various resources needed to execute the distributed computer application.

In a preferred embodiment, the application server 60 will be a Java application server which will have, at a minimum, an http server, a servlet engine, and the ability to host applets, among other things. The server should have the JDBC drivers for the database that the client tries to connect to and the servlet that the client communicates with. The server should also have the common set of classes required by our HTTP-JDBC driver (See Appendix B and the description below) as well as the server side classes (See Appendix C and the description below).

As shown, the database server 62 and CLIENT #N may be located behind a corporate security mechanism 64, such as a firewall that controls the access of users to the resources located behind the security mechanism and controls the access that users behind the security mechanism have to the Internet. Thus, as shown, the database server and the application server are separated from each other by the security mechanism that makes the execution of the distributed computer application more difficult. In a preferred embodiment, the database or datasource should be able to accept connection from the Java application server using the appropriate JDBC drivers, with little or no interference from security measures or firewalls. In addition, the client (CLIENT #N) and the distributed computer application system 24 are also separated from each other by the security mechanism that also makes the execution of the distributed computer application more difficult as will now be described.

In particular, the clients 22 that need a database connection to the database server 62 to execute a distributed computer application may not be able to connect to the server from behind secure corporate intranets. In more detail, since corporate intranets in general are secured with firewalls, proxies and other security measures, the clients will have to tunnel through them to gain access to the external resources. The problem is that most firewalls do not allow direct Internet Protocol (IP) traffic between the Internet and the internal network they are protecting. For example, most organizations behind firewalls have a well known proxy server running that allows people inside the organization to access the Web and, database servers.

The distributed computer application system typically needs extensive access to a variety of database servers that contain the necessary data to execute the distributed computer application. In general, JDBC drivers use a set of unique parameters for connecting to the database server and database servers, like all other servers, require the clients to connect to them through a particular port using client libraries and/or JDBC drivers. All JDBC drivers are required to conform to the JDBC API specifications developed by Sun Microsystems, Inc. Since all JDBC drivers are written to Java specifications all of them must implement the JDBC interfaces. The distributed computer application system in accordance with the invention connects and accesses data from databases using the JDBC drivers developed by the database vendors or third party developers. While connecting to the database server from the client seems to be an easy solution, JDBC drivers provided by the database vendors connect to the database using sockets and Java applets are restricted from making direct socket connections to other servers.

In a distributed computer application environment, the Java applets that may be used by the distributed computer application system to execute the application, need to communicate with the database server 62. However, Java applets are only allowed to communicate with the server that the applet is originated or downloaded from due to security restrictions. In addition, in a distributed computer application environment, it is more likely that the database server might be on a different server than the application server as shown in FIG. 1. These servers may only be reachable by the client using the HTTP protocol. Thus, connecting to the different servers may be difficult and not all the servers are reachable by the clients because they may be behind firewalls and proxy servers.

Thus, to establish a connection between the client and the one or more servers of the distributed computer application system, the HTTP protocol is the common protocol used to communicate with the servers and the best way for the applets to communicate with the server is by using HTTP protocol to be as compatible as possible with the proxy servers and network firewalls. The details of this type of secure connection will now be described in more detail.

Figure 2:
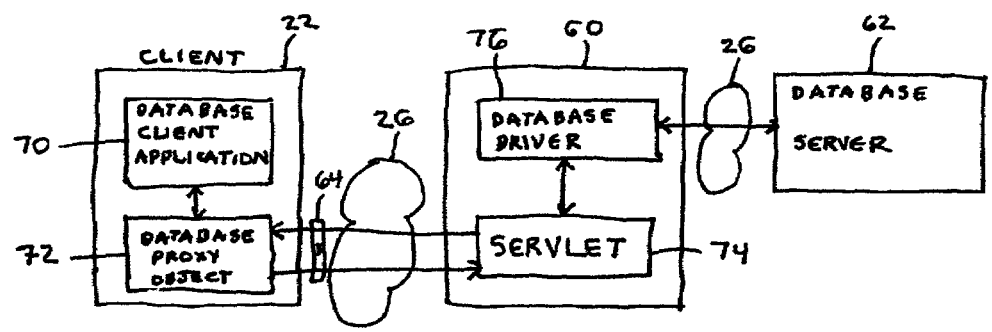
FIG. 2 illustrates more details of the system shown in FIG. 1.

FIG. 2 illustrates more details of the system shown in FIG. 1 wherein the client 22 is executing a database distributed computer application and needs to access data stored on a database server 62 wherein the client is behind a corporate firewall 64. In more detail, each client 22 may further include a database client application 70, that may be one or more Java applets downloaded from the application server 60 and being executed by the client computer and a database proxy object 72 that communicates with the application server 60 as shown to request data. The application server 60 may further include a set of Java servlets 74 (which are Java applets that are executed by the application server and whose user interface is served to the client computer as one or more web pages as is well known) and a set of database drivers 76 that access the data stored in the database server 62. In the example herein, the database drivers may be JDBC drivers. The set of servlets 74 help create the connections between the client and the application server and the database server, execute the database statements/queries on the application server, and return the database query results back to the client. The client interacts with the application server using the standard HTTP protocol.

In a preferred embodiment, other Java classes required both on the server and the client are the javax.sql package provided by JavaSoft. The common classes required by both the client and the server should be the same version of compiled classes as a requirement for serializing and deserializing. Now, an example of the method for accessing data in accordance with the invention will be described.

Figure 3A:
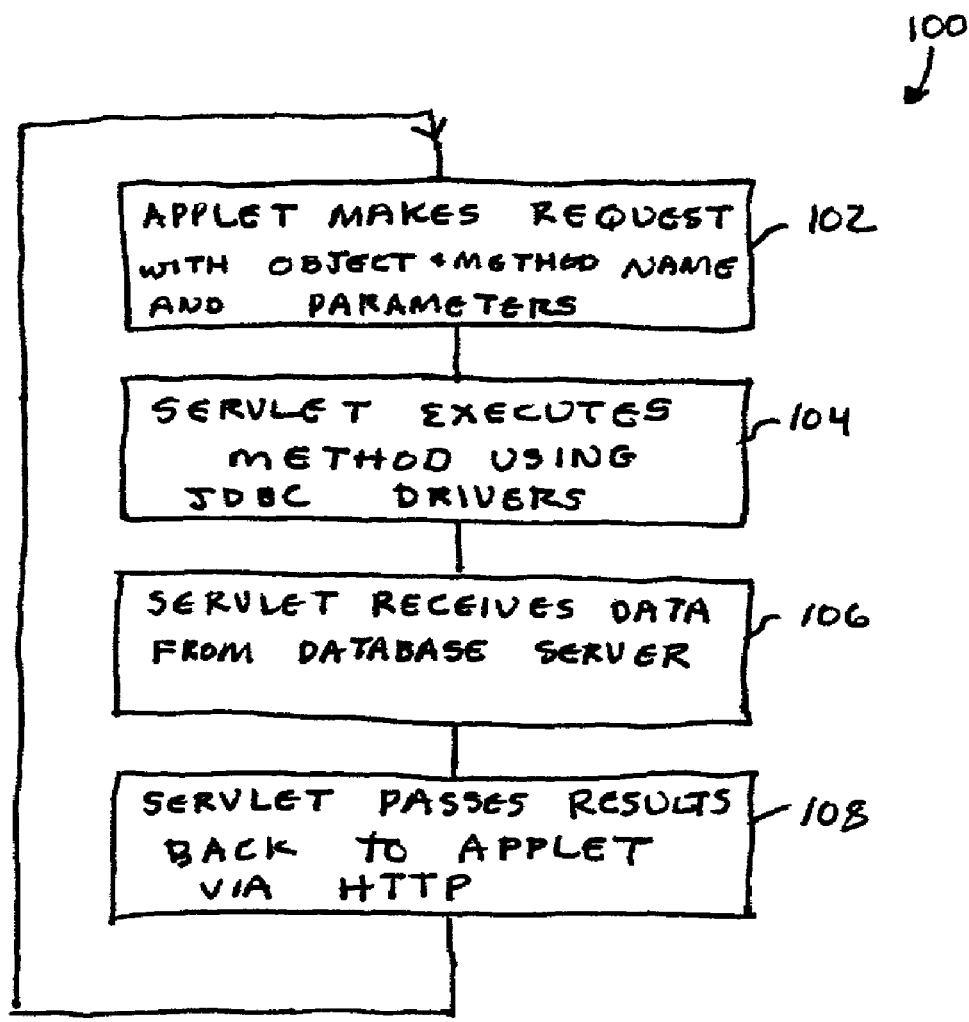
FIG. 3A illustrates a method for data accessing in accordance with the invention using the HTTP protocol and JDBC drivers.

FIG. 3A illustrates an example of a method 100 for accessing data in accordance with the invention. In particular, an applet being executed by the client as part of the database client application 70 may make a request to the servlet 74 using the HTTP protocol with an object name, a method name, and the parameters required to execute the method in step 102. The Servlet 74 in turn responds to the request by executing the method in step 104 (including accessing the database server). The servlet may then receive the results of the query in step 106 and pass the results back to the client in step 108 using the HTTP protocol. In accordance with the invention, HTTP-JDBC clients (as described below) together with Java's JDBC 2.0 API extension classes provide a better way for the applet to communicate with the servlets and provide the clients with the database driver functionality. Now, each portion of the system shown in FIG. 2 will be described in more detail.

To execute the distributed computer application in accordance with the invention, the application server 60 in accordance with the invention must have all of the drivers for the databases since these will not be downloaded to the clients for use by the applets. Thus, each client will not make connections directly to any database server so that the security problems may be avoided. In turn, the applets on the client may communicate with the servlets to do all of the database calls. The set of appropriate proxy objects 72 will communicate with the actual objects on the server as necessary.

On the server side, these driver classes 76 require the set of servlets 74 for creating and managing the objects created by calls from the HTTP-JDBC clients. These servlets use Java's reflection to reflect the specified public method of the object, and execute it, and return the results to the client. If a resultset is to be returned to the client, then a javax.sql.CachedRowSet object is created and returned to the client. The CachedRowSet object implements both a resultset and serializable interfaces which makes it easy to serialize it for transporting it back to the client and the client can treat it as a resultset.

All the objects created on the server are added to a hashtable with their unique name as the key. When the client makes a request to execute a method on an object by passing the unique name, the servlet gets it from the hashtable. These objects are available on the server as long as the session is active. Once the session is invalidated, the objects created in the session are closed, if they need to be closed, and they are removed from the session and the database connection is disposed off thus freeing all the resources associated with the database connections. These closed objects are then removed from the hashtable and will be available for garbage collection.

Each client 22 uses the typical HTTP protocol to communicate with the application server. The classes provided by the database vendor may not be serializable and may not be passed to the server and vice-versa. Thus, in this model, the client 22 may create the set of proxy objects 72 whose methods will mirror the methods of the JDBC objects created on the server. The client may then use these proxy objects 72 to communicate with the servlets 74. A new HTTP session is created on the client for each call to the DriverManager.connect( ) object. This object is the proxy for the actual session object on the server used later to execute methods and create statements on the server.

Since there is always a delay in connecting to the server via HTTP, the calls from the client to the server are batched for better performance. When a batch of statements are sent to the server for execution, the server executes them in the sequence they are created and returns the resultset along with the unique name of the actual object on the server. The proxy object 72 holds this name for contacting the object at a later time for executing another batch of methods on the same object. Depending on the method executed, the server will return either a resultset such as a unique name of a new object (e.g., Connection, Statement, PreparedStatement etc.) created on the server, or a null object. All the exceptions thrown by the server are serialized and sent to the client, if they should occur. If the execution of the method results in creating a new object on the server, then the unique name of the object is returned to the client. By overriding the finalize( ) method, as the proxy objects are garbage collected on the client, the actual objects will also be removed from the server and are also garbage collected.

Since the actual objects are created and held on the server, as required by the client, the proxy objects on the client are responsible for releasing them when they are not required. The calling of the close( ) method on the JDBC statement object releases all the resources held by the object. The servlet on the server maintains a list of active objects and it becomes the job of the servlet to remove all the references of the closed object to release all the resources on the server. When a close( ) method is called on an object, the servlet closes the object and also removes it from the list. If an object has a close( ) method, then the proxy object's finalize( ) method is overridden to call close( ), if it is not already closed. The finalize( ) method on Java object is called when the object is out of scope of the executing program, and has no references to it. This approach allows for better clean up of inactive objects on the server, thereby minimizing the memory requirements and maximizing the server performance. The functioning of the HTTP JDBC driver in accordance with the invention will be described in more detail now with reference to FIG. 3B.

Figure 3B:
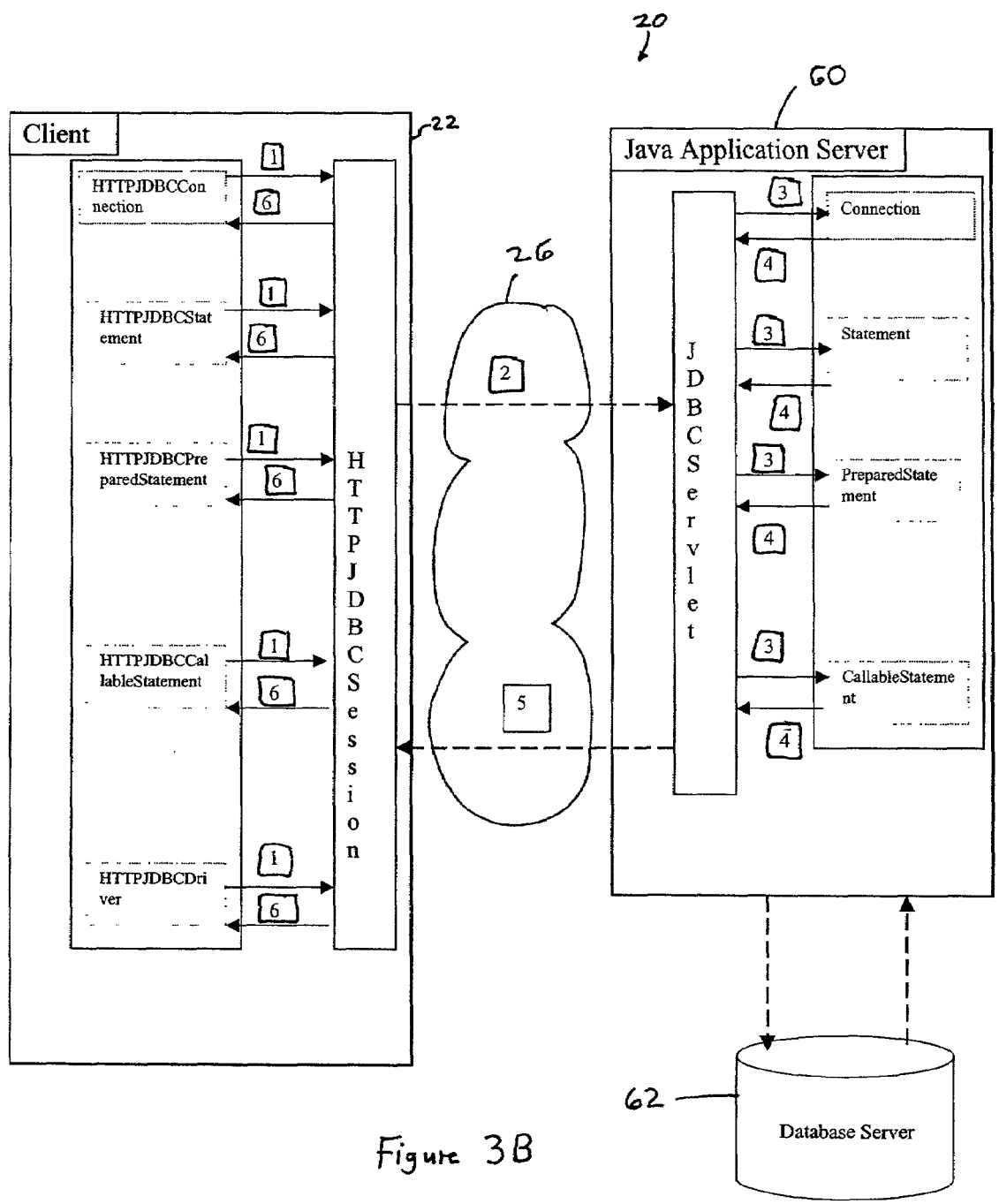
FIG. 3B is a block diagram illustrating the method for using the HTTP JDBC driver in accordance with the invention.

FIG. 3B is a block diagram illustrating a preferred embodiment of the method for using the HTTP JDBC driver in accordance with the invention wherein the client 22, the application server 60 and the database server 62 are shown along with the communications network 26. The diagram illustrates the interaction of the various Java classes that implement the method. To understand this diagram, a brief description of the Java classes is now provided. A more detailed description of the Java classes is provided below.

Client Classes

These classes are downloaded as part of the applet to the client. These classes are used to create proxy objects for communicating with the server. These classes are responsible for serializing the object that encapsulates the database calls and de-serialize the results received from the server.

Common Classes

Since the classes that implement the JDBC interfaces are not serializable, the client needs to communicate with the server using serialized objects. For serialization to work, some of the same classes are needed, for serializing and deserializing, on both the client and server. These set of common classes are to be installed on the server, and the same classes are to be downloaded to the client along with the applet. These set of classes also consist of JDBC 2.0 extension classes.

Server Classes

These classes are available on the application server and delegates the database calls between the database server and the applet. These classes primarily consist of a servlet and the supporting classes for processing the HTTP-JDBC calls from the client. These classes are responsible for de-serializing the object that encapsulates the database calls, executes the database call using the JDBC driver installed on the server, and returning back the results by serializing them.

Operation of Objects

While client and server objects function in isolation, the objects created using common classes are transported between the applet and the servlet. The serialized objects are tunneled through using HTTP between the client and the Java application server. When a query is executed which causes to return a table of data, java.sql.ResultSet object is created and returned. The server side classes of the HTTP-JDBC driver also makes use of the JDBC extension classes like javax.sql.CachedRowSet, which is sent back to the client from the server. Java.sql.ResultSet interface do not extend java.io.Serializable interface and so may not be capable of serializing. So, to solve the problem with serializing result sets to the client we create a CachedRowSet object from the result set and serialize it and return to the client.

The reason for creating proxy objects is because the objects created on the server when a database call is made are not transportable to the client as a Java object. For an object to be transportable it should be able to be serialized and de-serialized. The server application creates a javax.sql.CachedRowSet from the java.sql.ResultSet. javax.sql.CachedRowSet creates a serializable object from the java.sql.ResultSet object and since this also implements java.sql.ResultSet interface, the client application can just treat it as an object of type java.sql.ResultSet. There are many factors to consider in determining whether or not to transport objects and, in some instances, transporting objects is simply not viable. In these and other instances, it may be better to use proxy objects. Therefore, in the preferred embodiment of the invention, certain objects are transported and certain objects are proxied, as discussed herein.

Returning to FIG. 3B, the different steps performed during the secure data access in accordance with the invention using the HTTP JDBC drivers are shown as numbers inside of boxes (e.g., 1-6) wherein there may be interactions between more than one object or class during each step. For example, in the first step, the HTTPJDBCConnection, the HTTPJDBCPreparedStatement, the HTTPJDBCStatement, the HTTPJDBCCallableStatement and the HTTPJDBCDriver communicate with the HTTPJDBCSession class as shown.

The following steps are performed wherein the interaction of the objects and classes are shown in FIG. 3B.
1. An object of type InObject is created if it is a single call. A MethodList object is created if the call can be batched wherein the MethodList object consists of one or more InObjects for executing in a particular sequence on the server.
2. When a statement is executed on the client, the InObject is serialized and sent to the server for execution by the HTTPJDBCSession object which sets up the object for execution on the server.
3. The HTTPJDBCSession object calls the servlet (JDBCServlet) and passes the InObject to it. The Servlet receives the InObject along with the name of the actual object to execute the method on and the session in which the actual object exists. The servlet then retrieves the actual object from the list using the name and executes the method on the object.
4. The Servlet receives the return value from the actual object after executing the method.
5. The Servlet returns the value back to HTTPJDBCSession over the communications network using the HTTP protocol.
6. The HTTPJDBCSession object returns the value back to the proxy object which generated the method. The proxy object returns the results back to the calling program.

In more detail, the first step in a JDBC application is to create a database connection. This is done by loading the class of the appropriate driver. By doing so, all the connections are made by specifying a URL that will use the appropriate driver to make a connection. When an application wants to use the HTTP-JDBC driver, the HTTPJDBCDriver class is loaded.

While making the connection the URL to be specified may have the protocol as httpjdbc or httpsjdbc. When a connection is created using this HTTP-JDBC driver the HTTPSession sends the URL and properties to connect to the database to the server. The connection is made on the server and the Connection object is given a unique name and is added to the list of objects on the server. This unique name may be sent back and the proxy object of type HTTPJDBCConnection is created on the client and the unique name may be the name of the newly created proxy object. Then the application on the client may use the connection to execute the sql statements.

HTTPSession object on the client, created when a driver is loaded, contacts the JDBCServlet on the application server and sends the InObject or MethodList object for processing. Application may start using the HTTPJDBCConnection object just like a JDBC connection object. It may start executing various methods on the Connection object, just like in a typical JDBC application. When a method called by the application is to return a result then the proxy object will send the method(s) to the HTTPJDBCSession. HTTPJDBCSession object then makes a connection to the servlet on the server and sends the method(s) in one call. The JDBCServlet executes all the methods on the object in the same sequence as they are called on the client and returns the results to the HTTPJDBCSession object which in turn may return this back to the proxy object as a return value. Since the application that made the call on the proxy object is expecting a return value, the proxy object returns it to the application.

The JDBCServlet will use the unique name of the object to get the object from the list and execute the method, or sequence of methods on the object. Since the object on the server are JDBC objects, these objects are responsible for performing the required actions by connecting to the database and returning the values back. The JDBCServlet send back the OutObject which has the result after executing the method(s) and also the unique name if the servlet results in creating a new JDBC object on the server.

The table below illustrates an example of the key proxy objects and other key client-side objects of the HTTPJDBC driver, in the left column, and the corresponding server-side objects of the typical JDBC driver, in the right column. The purpose of the following table is to show a relative comparison between typical key JDBC driver objects and the key objects of the present invention in order to demonstrate a comparison of function and the relative differences.

TABLE 1

| Client Proxy Classes | Conventional JDBC Classes |
| --- | --- |
| HTTPJDBCDriver | java.sql.Driver |
| HTTPJDBCConnection | java.sql.Connection |
| HTTPJDBCStatement | java.sql.Statement |
| HTTPJDBCPreparedStatement | java.sql.PreparedStatement |
| HTTPJDBCCallableStatement | java.sql.CallableStatement |
| HTTPJDBCDatabaseMetadata | java.sql.DatabaseMetadata |
| CachedRowSet | java.sql.resultset |

An example using the HTTP-JDBC Driver is shown below as a piece of code.

// creates a Connection object on the server

HTTPJDBCConnection connection=HTTPJDBCDriver.connect(URL, properties);

-- start batch

HTTPJDBCPreparedStatement
    pstmt=connection.prepareStatement(String stmt);
pstmt.setString(1, String);
pstmt.setInt(2, int);
pstmt.setDate(3, Date);
ResultSet rset=(ResultSet)pstmt.executeQuery( ); // CachedRowSet object is returned
pstmt.close( );
rset.close( )
-- end batch.

Now, a technique for downloading the drivers in accordance with the invention will be described. The distributed computer application system requires a set of classes that are to be downloaded as part of the applet to the clients. The servlets must be registered on the server with a Servlet container. The registering of a servlet will deploy the servlet each time a server is started or restarted. A set of initial arguments can be provided to the servlet when it is registered. Some servlet containers allows the registered servlets to work in the security framework of the server, by defining access controls. In addition, all of the drivers must be installed on the server and made available to the servlets. The drivers may be loaded by the servlet when required.

The details of the various Java classes used in the preferred embodiment will now be described. In the attached Appendices (Appendix A, Appendix B and Appendix C), the source code for the various novel classes being described herein is provided. The server side classes may include various classes. For example, the server side classes may include a JDBCServerlet wherein this servlet, that is registered on the server, is called from the client with the method or batch of methods to be executed on the application server and return the results back to the client. The server may also include a ServerSessions class which is an object on the server created for each client session that is responsible for holding the JDBCServerSession objects (described below) created by the servlet. The server may also include a ServerSessions class which holds the active JDBCServerSession object that is created for each HTTPJDBCSession on the client. The JDBCServerSession object maintains all of the objects created for a session in a list. This class has the methods to close an object, if it can be closed, and remove it from the list. A SQLServer class is a particular implementation showing how to connect to a SQLServer database, depending on the properties provided by the client using the appropriate driver. The server may also include an Oracle class which is a particular implementation showing how to connect to a Oracle database, depending on the properties provided by the client using the appropriate driver. The server may also include a DBConnectionFactory which is used by the JDBCServlet to create connections to different databases and return them as type java.sql.Connection. The server may also include a DBVendor class that provides a common interface for implementing how to connect to a database using the driver provided by a database driver vendor.

In a preferred embodiment, there may be a number of shared classes that are shared between the client and the server. These classes may include an InObject which is a class that is responsible for creating the types for each parameter and is sent to the server along with the values for the parameters. The servlet takes this object and finds the correct object from the list depending on the session name and object name. The server then executes the method this object represents and returns the value back to the client. An object of the type InObject is created for each method call. The classes may further include a MethodList class that extends java.util.ArrayList and holds all the methods to be executed as a batch. Each element in this list is of type InObject. When the server completes executing the batch it adds a name to this MethodList and sends back to the client along with the unique name. A NullObject is also included in the common objects since a null value cannot be serialized and transported back to the client. In particular, this object will be returned when a method call results in returning a null object. The common classes may further include an OutObject which is returned to the client along with a unique name and the resultset.

In a preferred embodiment, there may be a number of client classes that reside on the client. These classes may include a HTTPJDBCCallableStatement class that extends java.sql.PreparedStatement and implements the java.sql.CallableStatement interface. This proxy object is created on the client when the HTTPJDBCConnection.prepareCall( . . . ) is executed. The Ads actual object of type CallableStatement is created on the server and the unique name is sent back to the proxy object on the client which holds it. The client may also include a HTTPJDBCConnection class that extends JDBCStub (see below) and implements java.sql.Connection interface. This proxy object is created on the client when the HTTPJDBCDriver.connect( . . . ) is executed. The actual object of type java.sql.Connection is created on the server and the unique name is sent back to the proxy object on the client which holds it. The client may further include a HTTPJDBCDatabaseMetaData class that extends JDBCStub and implements java.sql.DatabaseMetaData interface. This proxy object is created on the client when the HTTPJDBCConnection.getMetaData( ) is executed. The actual object of type DatabaseMetaData is created on the server and the unique name is sent back to the proxy object on the client which holds it. The client further includes a HTTPJDBCDriver class that implements the java.sql.Driver interface. All of the connections created using this driver will be of type HTTPJDBCConnection. This follows the standard procedure for writing JDBC driver java.sql.Driver specifications from Java Soft. This creates a HTTPJDBCSession on the client and also opens a communication channel with the server for executing all JDBC calls.

The client may further include a HTTPJDBCPreparedStatement class that extends HTTPJDBCStatement and implements java.sql.PreparedStatement interface. This proxy object is created when the HTTPJDBCConnection.prepareStatement( . . . ) is executed. The actual object of type PreparedStatement is created on the server and the unique name is sent back to the proxy object on the client which holds it. A HTTPJDBCSession is the object that is responsible for serializing and deserializing the InObject or the MethodList depending on the type of call that is made and sent to the server and the OutObject or CachedRowSet object that is sent back. A HTTPJDBCStatement is a class that extends JDBCStub and implements java.sql.Statement interface. This proxy object is created when the HTTPJDBCConnection.createStatement( ) is executed. The actual object of type Statement is created on the server and the unique name is sent back to the proxy object on the client which holds it. A JDBCStub is a client side class only that has a set of methods that is extended by any class that needs to hold a unique name. Now, to better understand the invention, the differences between the typical JDBC driver and the HTTP JDBC driver in accordance with the invention will now be described.

The differences between the typical JDBC driver and the HTTP JDBC driver in accordance with the invention will illustrate the advantages and benefits of the HTTP JDBC driver in accordance with the invention. For example, the applet requirements for connection to a database is different.

In particular, for the typical JDBC drivers, the drivers have to be downloaded to the client along with the applet. This is problematic since the drivers may be bulky and the client may take a long time to download all of the required classes to start using the driver. If the client needs to connect to different databases with different drivers, then all of the compatible drivers have to be downloaded at invocation of the applet. If the database does not have a pure JDBC driver, then additional software may be required to be installed on the client with the applet is invoked. Using the HTTP JDBC drivers in accordance with the invention, only a small set of classes needs to be downloaded along with the applet to the client. In addition, since connecting to multiple databases is made possible on the server side, none of those drivers to connect to the multiple databases needs to be downloaded to the client. Thus, the HTTP JDBC driver alone will make it possible to connect to different database servers. This model in accordance with the invention will even support JDBC drivers which require additional software, since they will be installed on the server itself instead of the client. The HTTP JDBC driver in accordance with the invention provides the faster downloading of applets to the clients since these drivers make the clients thin, when it comes to communicating with the database servers.

The typical JDBC drivers also differ from the HTTP JDBC drivers in their protocol requirements. In particular, the JDBC drivers typically use proprietary protocols for communicating with the server so that each vendor may have different network protocol requirements. Thus, each different database may require its own protocol and hence must be downloaded to the client applet. In contrast, the HTTP JDBC driver uses the HTTP protocol to proxy the calls over HTTP to the application server layer. Then, the JDBC drivers available on the server are responsible for communicating with the database server and returning the results. The HTTP JDBC driver in accordance with the invention thus requires no special configuration at the client level. In addition, no matter what protocol the driver actually uses, that specific protocol is handled by the application server and the protocol is only utilized between the application server and the database server.

The typical JDBC driver also differs in the way that it may establish a connection as opposed to the HTTP JDBC drivers. In particular, the typical JDBC drivers connect directly to the server from the downloaded applet, if all the security, firewall and proxy requirements are met. The JDBC connection is based on parameters supplied to the database driver. The problem is that each database vendor uses different protocols and ports to connect to their database servers. In addition, due to the security restrictions in using applets, JDBC drivers downloaded to the client along with the applet may not be able to communicate with the database server because the database server may not be on the same host as the applet that was downloaded to the client so that the applet is not permitted to communicate with the database server. Furthermore, protocol and port requirements to connect to the database servers may not be satisfied in corporate environments. The HTTP JDBC driver in accordance with the invention connects to the database via the application server layer and uses the same protocol and port that the client uses to download the applet thus making it more secure. In addition, since the application server actually establishes the connection, this process may take less time due to the network speed and processing capabilities of the servers. The advantages of better security and faster response times result from the use of the standard well known HTTP protocol and its standard ports, such as port 80.

The typical JDBC drivers and the HTTP JDBC driver in accordance with the invention also differ in the technique for sending SQL statements for execution. In particular, for the JDBC driver, when a statement is created, it is sent to the server immediately for compiling, after which this is ready for execution. In contrast, for the HTTP JDBC driver, a statement is sent to the application server, when it needs to be executed, for compilation and execution in batch mode all at the same time, using the built in batching techniques wherein one or more database requests are combined together in a single request. The batching of the SQL statements reduces the number of calls to the application server, thereby improving the performance and speed of the system.

The typical JDBC driver and the HTTP JDBC driver in accordance with the invention also differ in the way that they process the results. In particular, for the typical JDBC driver, the client, after executing the SQL statement, receives the results from the database and processes them. In contrast, with the HTTP JDBC driver in accordance with the invention, the server executes the statement, receives and processes the results, creates a "serializable" object(CachedRowSet) and sends it using the HTTP protocol to the client. Thus, the processing of results and the computation load for the processing is shared by both server and client so that it may be executed more quickly. An example of the above differences will now be described with reference to FIGS. 4 and 5 to better illustrate those differences.

Figure 4:
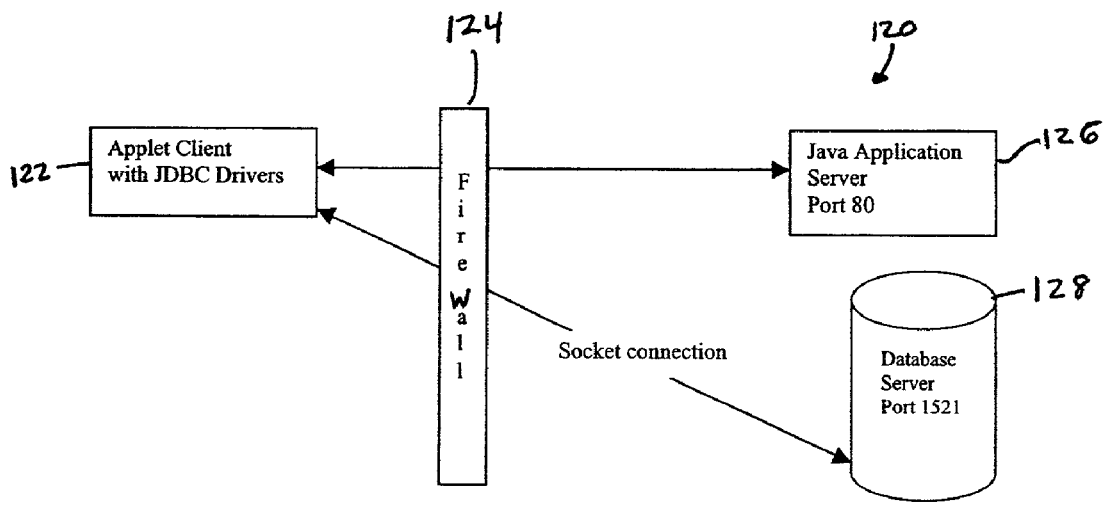
FIG. 4 illustrates a typical JDBC client database connection.

FIG. 4 illustrates a typical JDBC client database connection system 120. In particular, an applet client 122 is shown that is located behind a firewall 124. With this typical arrangement, the client applet may include the JDBC drivers which has the disadvantages set forth above. The system may also include a Java application server 126 and a database server 128 that interact with the client in order to retrieve data from the database. As shown, to accomplish this task using this typical system and connection, the applet and the Java application server may interact and communicate with each other over Port 80 as is well known. Then, the client applet must communicate directly with the database server using the JDBC drivers and a typical socket connection using port 1521 which is the usual port for database access. As described above, this configuration is problematic since the client applet may be unable to connect to the database server using port 1521 due to the firewall. In the alternative, it is necessary that the firewall is programmed to allow the applet to connect to the database server running on port 1521 which leaves a hole in the security of the firewall that can be exploited.

The following piece of code illustrates how a typical applet can connect to the database server using JDBC drivers that are downloaded along with the applet as shown in FIG. 4.

```
// load the appropriate driver for connecting to the desired database
server, Oracle
// Sybase, or SQL Server
Class.forName("jdbc.DriverClassName");
// connect to the database at the specified URL with the login and
password
// URL string specifies the database host, server name, port other required
parameters to connect to //the database.
Connection con = DriverManager.getConnection(URL, "myLogin",
"myPassword");
Statement stmt = con.createStatement( );
Connection con = DriverManager.getConnection(URL, "myLogin",
"myPassword");
```

-continued

```
Statement stmt = con.createStatement( );
ResultSet rset = stmt.executeQuery("select * from table");
While (rset.next( )){
    String col1Value = rset.getString("column1");
    // get the values from the resultset
}
```

Now, the HTTP JDBC driver in accordance with the invention that has the above described advantages and benefits over the typical client applet with JDBC drivers will be described.

Figure 5:
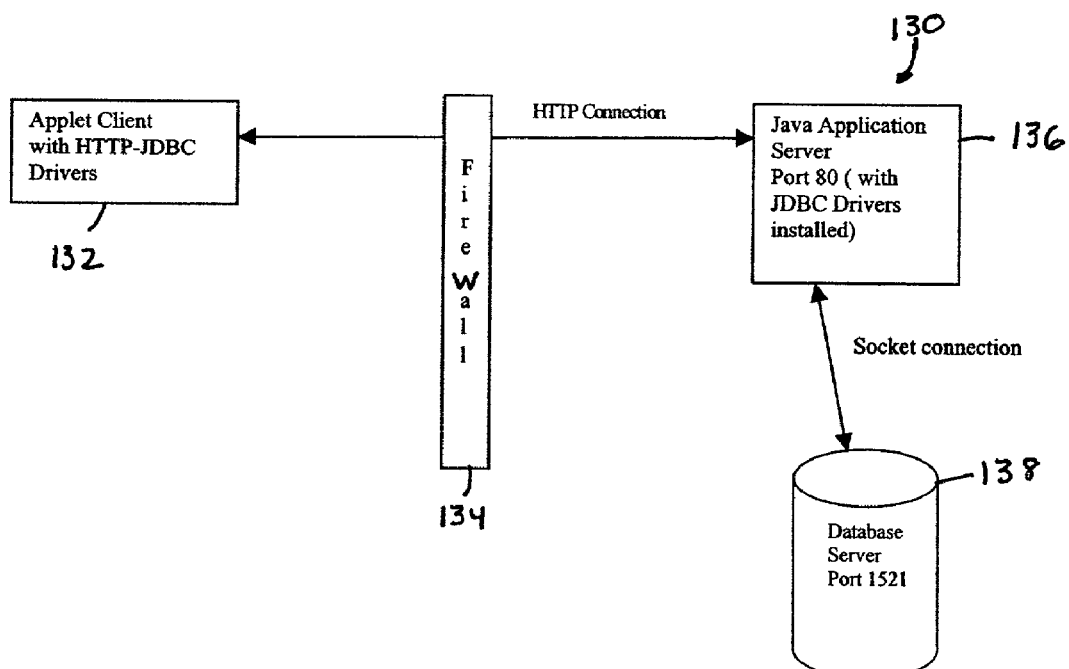
FIG. 5 illustrates a connection to a database using the HTTP JDBC driver in accordance with the invention.

FIG. 5 illustrates a connection to a database using the HTTP JDBC driver system 130 in accordance with the invention. In particular, an applet client with the HTTP JDBC drivers 132 is shown behind a firewall 134. In particular, the firewall separates the applet client from an Java application server 136. To request data from a database server 138, the applet client may generate an HTTP request that passes through the firewall to the application server over the typical port 80. The application server, with JDBC drivers installed in accordance with the invention, may then generate a database request and then create a socket connection over port 1521 to the database server as shown without passing through the firewall. The application server may receive the response from the database server and then forward the response back to the applet client using the typical HTTP protocol. As shown, with the system in accordance with the invention, the applet client does not have to attempt to access the database server directly and the socket connection between the application server and the database server is not interfered with by the firewall.

The following piece of code illustrates how a HTTP JDBC applet in accordance with the invention requests data from the database server using the HTTP JDBC drivers in accordance with the invention.

```
// load the HTTP-JDBC Driver using the appropriate class name
Class.forName("com.VSDV.HTTPJDBC.Client.Driver");
// connect to the database at the specified URL with the login and
password
// URL string specifies the protocol, database host, server name, port other
required
// parameters to connect to the database
// While using the HTTP-JDBC driver the protocol should be httpjdbc or
httpsjdbc
Connection con = DriverManager.getConnection(URL, "myLogin",
"myPassword");
Statement stmt = con.createStatement( );
ResultSet rset = stmt.executeQuery("select * from table");
While (rset.next( )){
    String col1Value = rset.getString("column1");
    // get the values from the resultset
}
```

The HTTP JDBC driver system in accordance with the invention may be used with various different JDBC drivers. In particular, since the driver system in accordance with the invention uses proxy objects to communicate with the application server, any type of JDBC driver can be supported without any change to the existing code. In other words, all of the JDBC driver types can be supported without having the clients download any code so that no installation of the drivers is required on the client. Thus, the HTTP JDBC driver system is adaptable and can be used with any past, current or future JDBC driver. In addition, the servlets of the application server that are executed when a JDBC call is made can use any type of driver available for a specific platform. This driver can support any or all the types of drivers that are available for the platform that the application server is installed. These types of drivers may include the following:

Type 1—JDBC-ODBC bridge plus ODBC driver;
    Type 2—Native-API partly-Java driver;
    Type 3—JDBC-Net pure Java driver; and
    Type 4—Native-protocol pure Java driver.

For more information on these types of drivers refer to the driver types documentation page at http://java.sun.com/j2se/1.3/docs/guide/jdbc/getstart/intro.html#1018502. Now, the advantages of using the HTTP JDBC driver system in different scenarios will be described in more detail.

The downloading of the code to the client as part of the applet and creating proxy objects on the client for communicating with the JDBC objects gives the clients enormous power during runtime. For example, a client may dynamically connect to any database through the application server if the suitable drivers are loaded on the server. Since the JDBC communication is proxied by the client, all that is needed are the set of parameters for connecting to a database server. If a JDBC compliant driver can be found for the Java application server then the client can create a proxy object to communicate with the database connection object on the server. In fact, regardless of the protocol and communication requirements for a particular database, the client code does not change and no additional code will need to be downloaded for connecting to a different database. In addition, the client side of the driver can delegate calls to any database provided the application server has the suitable driver for connecting to the database. Unlike traditional JDBC drivers that are different for each different database, the HTTP JDBC driver in accordance with the invention remains the same for accessing any database. A first scenario that may use the HTTP JDBC driver in accordance with the invention is a client/server system.

In this scenario, the database server and the Java application server are both on the same physical machine/computing resource. The client that is accessing the application is behind a firewall. The firewall allows only HTTP protocol communications and permits connections to a particular port, typically port 80. Both the web service provided by the Java application server and the database server cannot listen for incoming requests on the same port and both the services use different protocols. Thus, even though the applet is allowed to make socket connections to the server it is downloaded from, the firewall might prevent this from occurring when using a traditional JDBC driver. Thus, the HTTP-JDBC driver can be very useful in this scenario.

Figure 6:
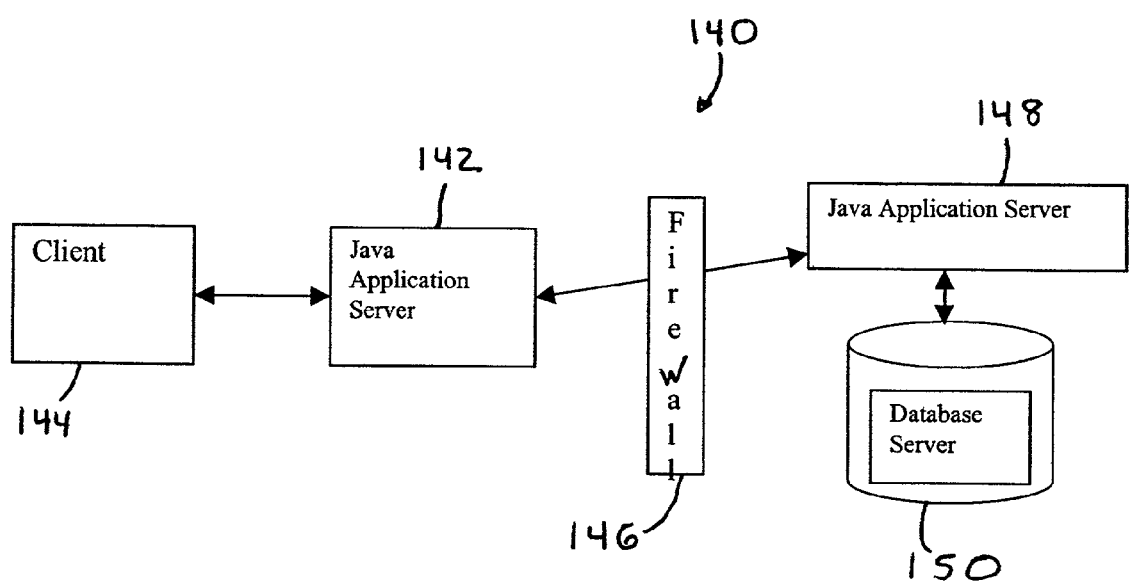
FIG. 6 illustrates an application server being used as the client for another server in accordance with the invention.

In another scenario, the database server and the application server are on separate physical machines and have different IP addresses. This is the scenario that was shown in FIG. 2 and described above. In another scenario, the application server may be a client for another application server. FIG. 6 illustrates a system 140 wherein an application server 142 is being used as the client for another server in accordance with the invention. In particular, a client 144 may connect and communicate with the application server 142 wherein the client and application server are both on the same side of a firewall 146. On the other side of the firewall is a second application server 148 and a database server 150. In more detail, the Java application server 142 behind a firewall would become a client to another Java application server 148 that is outside the firewall and has access to the database 150. This architecture is very useful for server side programs requiring database access to disparate data sources wherein all the security restrictions can be overcome by using the HTTP-JDBC driver in accordance with the invention. In one embodiment, the HTTP JDBC driver system may be used by all the J2EE components that are provided by the Java application server that requires database access.

In another scenario, the HTTP JDBC driver in accordance with the invention may be used effectively in distributed computing. In particular, the HTTP-JDBC driver will provide a solution for connecting to disparate and/or external data sources in a distributed computing environment. Since the HTTP JDBC driver is based on the most common Internet communication protocol, the driver can be used by any device in a network that has a Java runtime environment with HTTP protocol support. In addition, since the technology for distributed computing using Java components is emerging and evolving rapidly, any Java component in a Java enabled distributed environment can efficiently use HTTP-JDBC driver to gain access to disparate data sources In another scenario, the HTTP JDBC driver may be used with Jini Services. The Jini technology enables open end-to-end solutions for creating dynamically networked products, services, and applications that scale from device to the enterprise. The HTTP-JDBC driver may be used to provide dynamic database access to a wide variety of databases and other data sources that are required by a Jini service. Since Jini clients can be behind secure networks, the same problems, explained earlier, arise when trying to connect to the database using a protocol and a port that is prohibited by the firewall. Because of the advantages this has over typical JDBC drivers, explained earlier, this will provide a better solution both in terms of downloading a small piece of code and delegating all the database access to the Java application server that is outside the firewall and has access to the database server. This driver can be snapped in to a service dynamically and provide the database access without the communication restrictions of the firewall. In this scenario the database connectivity parameters may be provided dynamically depending on the client requiring access to the database.

In another scenario, the driver may be used with peer-to-peer computing systems such as project JXTA. In particular, in a Java peer-to-peer environment, the driver in accordance with the invention may be used to access a disparate data source without having to download a lot of classes while using the most common internet protocol HTTP. Since JXTA does not specify any language requirements, this driver can support any two peers in which one peer has a Java virtual machine and the other has a Java application server. Since the HTTP-JDBC driver can work on clients with a small memory footprint this can be used by virtually any device in a peer group that has the Java runtime environment. Since JXTA specification does not specify that the peers be developed in a particular language for interoperability, this driver can support any peer in a peer-to-peer environment with a Java virtual machine and HTTP support. The peers can use this driver to gain access to a database outside of the firewall by connecting to a Java application server and delegating all the database communication to the server side components of the driver installed on the application server.

In more detail, Project JXTA addresses the need for an open, generalized protocol that inter-operates with any peer on the network including PCs, servers and other connected devices. The goal of project JXTA is to develop basic building blocks and services that would enable innovative applications for peer groups. A peer can offer a service by itself or in co-operation with other peers. In a peer-to-peer service model, if a service should provide access to a database, then using this driver would make access to the database simple and efficient. If a peer was to gain access to a database outside of the firewall then using this driver would make it easier to penetrate the firewall using the most widely used protocol HTTP and port 80. In this environment the parameters to connect to a database might vary from service to service or even at a peer level, this driver provides an efficient way of gaining access to the database because of all it's virtues explained above.

In a peer group one of the peers can provide this driver as a part of the peer group service to connect to any database. The peer delivering this service component can have all the required drivers to connect to different databases or it can discover these drivers available on the network and provide the database access to the required database.

Additional details of the HTTP tunneling, servlets and session tracking used to implement the HTTP JDBC driver in accordance with the invention may be found at the locations below. The information located at those links are incorporated herein by reference.

HTTP Tunneling http://developer.java.sun.com/developer/technicalArticles/InnerWorkings/Burrowing/index.html http://developer.java.sun.com/developer/technicalArticles/InnerWorkings/JDCPerformTips/

Servlets and Session Tracking http://java.sun.com/docs/books/tutorial/servlets/client-state/session-tracking.html http://java.sun.com/j2ee/tutorial/doc/Servlets11.html http://java.sun.com/docs/books/tutorial/servlets/TOC.html While the foregoing has been with reference to a particular embodiment of the invention, it will be appreciated by those skilled in the art that changes in this embodiment may be made without departing from the principles and spirit of the invention, the scope of which is defined by the appended claims.

Client Side Classes

Class HTTPJDBCCallableStatement ... 2
Class HTTPJDBCConnection ... 6
Class HTTPJDBCDatabaseMetadata ... 10
Class HTTPJDBCDriver ... 28
Class HTTPJDBCPreparedStatement ... 30
Class HTPJDBCSession ... 37
Class HTTPJDBCStatement ... 42
Class JDBCStub ... 47

Class HTTPJDBCCallableStatement package com.VSDV.HTTPJDBC.Client;

import java.sql.*;
import java.util.*;
import java.math.*;

import com.VSDV.HTTPJDBC.Common.*;

```
/**
 * LFRT class implementing java.sql.CallableStatement
 */
public class HTTPJDBCCallableStatement extends HTTPJDBCPreparedStatement
implements CallableStatement { public HTTPJDBCCallableStatement(HTTPJDBCConnection con, String objectName,
Object[] parameters) {
    super(con, parameters);
  } public void initializeStatement(HTTPJDBCConnection con, Object[] parameters){
    InObject defaultMethodObject = new InObject(con.getName(), "", parameters, true);
    defaultMethodObject.setMethod("prepareCall");
    addToMethodList(defaultMethodObject);
  } public void registerOutParameter(int parameterIndex, int sqlType) throws
SQLException {
    InObject inObject = new InObject(objectName, "registerOutParameter", new Object[]
{new Integer(parameterIndex), new Integer(sqlType) }, false );
    addToMethodList(inObject);
  } public void registerOutParameter(int parameterIndex, int sqlType, int scale) throws
SQLException {
    InObject inObject = new InObject(objectName, "registerOutParameter", new Object[]
{new Integer(parameterIndex), new Integer(sqlType), new Integer(scale) } ,false);
    addToMethodList(inObject);
  } public boolean wasNull() throws SQLException {
    Boolean b = (Boolean)session.call(objectName, "wasNull" , true);
    return b.booleanValue();
  }
```

```
public String getString(int parameterIndex) throws SQLException {
    return (String)session.call(objectName, "getString", new Object[] {new
Integer(parameterIndex) } ,true);
} public boolean getBoolean(int parameterIndex) throws SQLException {
    Boolean b = (Boolean)session.call(objectName, "getBoolean", new Object[] {new
Integer(parameterIndex) }, true );
    return b.booleanValue();
} public byte getByte(int parameterIndex) throws SQLException {
    Byte b = (Byte)session.call(objectName, "getByte", new Object[] {new
Integer(parameterIndex) } , true );
    return b.byteValue();
} public short getShort(int parameterIndex) throws SQLException {
    Short b = (Short)session.call(objectName, "getShort", new Object[] {new
Integer(parameterIndex) } ,true );
    return b.shortValue();
} public int getInt(int parameterIndex) throws SQLException {
    Integer b = (Integer)session.call(objectName, "getInt", new Object[] {new
Integer(parameterIndex) },true );
    return b.intValue();
} public long getLong(int parameterIndex) throws SQLException {
    Long b = (Long)session.call(objectName, "getLong", new Object[] {new
Integer(parameterIndex) }, true );
    return b.longValue();
} public float getFloat(int parameterIndex) throws SQLException {
    Float b = (Float)session.call(objectName, "getFloat", new Object[] {new
Integer(parameterIndex) }, true );
    return b.floatValue();
} public double getDouble(int parameterIndex) throws SQLException {
    Double b = (Double)session.call(objectName, "getDouble", new Object[] {new
Integer(parameterIndex) } , true);
    return b.doubleValue();
```

}

```
public BigDecimal getBigDecimal(int parameterIndex, int scale) throws SQLException
{
  return (BigDecimal)session.call(objectName, "getBigDecimal", new Object[] {new
Integer(parameterIndex), new Integer(scale) }, true);
} public byte[] getBytes(int parameterIndex) throws SQLException {
  return (byte[])session.call(objectName, "getBytes", new Object[] {new
Integer(parameterIndex) } , true);
} public java.sql.Date getDate(int parameterIndex) throws SQLException {
  return (java.sql.Date)session.call(objectName, "getDate", new Object[] {new
Integer(parameterIndex) }, true );
} public java.sql.Time getTime(int parameterIndex) throws SQLException {
  return (java.sql.Time)session.call(objectName, "getTime", new Object[] {new
Integer(parameterIndex) }, true );
} public java.sql.Timestamp getTimestamp(int parameterIndex) throws SQLException {
  return (java.sql.Timestamp)session.call(objectName, "getTimestamp", new Object[]
{new Integer(parameterIndex) } ,true);
} public Object getObject(int parameterIndex) throws SQLException {
  return session.call(objectName, "getObject", new Object[] {new
Integer(parameterIndex) },true );
}

//--------------------------JDBC 2.0-------------------------- public BigDecimal getBigDecimal(int parameterIndex) throws SQLException {
  return (BigDecimal)session.call(objectName, "getBigDecimal", new Object[] {new
Integer(parameterIndex) } ,true);
} public Object  getObject (int i, java.util.Map map) throws SQLException {
  return (Object)session.call(objectName, "getObject", new Object[] {map},true );
} public Ref getRef (int i) throws SQLException {
  return (Ref)session.call(objectName, "getRef", new Object[] {new Integer(i) },true );
```

```
} public Blob getBlob (int i) throws SQLException {
    return (Blob)session.call(objectName, "getBlob", new Object[] {new Integer(i) }
,true);
  } public Clob getClob (int i) throws SQLException {
    return (Clob)session.call(objectName, "getClob", new Object[] {new Integer(i) }
,true);
  } public Array getArray (int i) throws SQLException {
    return (Array)session.call(objectName, "getArray", new Object[] {new Integer(i) },true
);
  } public java.sql.Date getDate(int parameterIndex, Calendar cal)
            throws SQLException {
    return (java.sql.Date)session.call(objectName, "getDate", new Object[] {new
Integer(parameterIndex), cal } ,true);
  } public java.sql.Time getTime(int parameterIndex, Calendar cal)
            throws SQLException {
    return (java.sql.Time)session.call(objectName, "getTime", new Object[] {new
Integer(parameterIndex), cal },true );
  } public java.sql.Timestamp getTimestamp(int parameterIndex, Calendar cal)
            throws SQLException {
    return (java.sql.Timestamp)session.call(objectName, "getTimestamp", new Object[]
{new Integer(parameterIndex), cal } ,true);
  } public void registerOutParameter (int paramIndex, int sqlType, String typeName)
throws SQLException {
    InObject inObject = new InObject(objectName, "registerOutParameter", new Object[]
{new Integer(paramIndex), new Integer(sqlType), typeName } ,false);
    addToMethodList(inObject);
  }
}
```

Class HTTPJDBCConnection

```java
package com.VSDV.HTTPJDBC.Client;

import java.sql.*;
import java.util.*;

import com.VSDV.HTTPJDBC.Common.*;

/**
 * LFRT class implementing java.sql.Connection
 */
public class HTTPJDBCConnection extends JDBCStub implements Connection {

HTTPJDBCSession session;
  boolean closed, isReadOnly;

public HTTPJDBCConnection(HTTPJDBCSession session, String objectName) {
          super(objectName);  // This names the object name
    this.session = session; // Each conneciton is assigned to a HTTPJDBCSESSION
    closed = false;
  } public String makeTestCall() throws SQLException {
    return (String)session.call("testobject", "testMethod", true);
  } public void clearWarnings() throws SQLException {
    session.call(objectName, "clearWarnings", false);
  } public void close() throws SQLException {
          session.call(objectName, "close", false);
    closed = true;
  } public void commit() throws SQLException {
    session.call(objectName, "commit", false );
  } public boolean getAutoCommit() throws SQLException {
          Boolean b = (Boolean)session.call(objectName, "getAutoCommit", true );
          return b.booleanValue();
  } public String getCatalog() throws SQLException {
```

```
  return (String)session.call(objectName, "getCatalog", true);
} public DatabaseMetaData getMetaData() throws SQLException {
  String n = (String)session.call(objectName, "getMetaData", true);
  HTTPJDBCDatabaseMetaData stmt = new HTTPJDBCDatabaseMetaData(this, n);
  return stmt;
} public int getTransactionIsolation() throws SQLException {
  Integer i = (Integer)session.call(objectName, "getTransactionIsolation", true);
        return i.intValue();
} public SQLWarning getWarnings() throws SQLException {
        return (SQLWarning)session.call(objectName, "getWarnings", true);
} public Statement createStatement() throws SQLException {
  HTTPJDBCStatement stmt = new HTTPJDBCStatement(this);
  return stmt;
} public boolean isClosed() throws SQLException {
        return closed;
} public boolean isReadOnly() throws SQLException {
        return isReadOnly;
} public String nativeSQL(String sql) throws SQLException {
  return (String)session.call(objectName, "nativeSQL", new Object[] {sql}, true );
} public CallableStatement prepareCall(String sql) throws SQLException {
        HTTPJDBCCallableStatement stmt = new HTTPJDBCCallableStatement(this, null, new Object[] {sql});
  return stmt;
} public PreparedStatement prepareStatement(String sql) throws SQLException {
        HTTPJDBCPreparedStatement stmt = new HTTPJDBCPreparedStatement(this, new Object[] {sql});
  return stmt;
}
```

```java
public void rollback() throws SQLException {
        session.call(objectName, "rollback", false);
} public void setAutoCommit(boolean autoCommit) throws SQLException {
        session.call(objectName, "setAutoCommit", new Object[] {new
Boolean(autoCommit)}, false );
} public void setCatalog(String catalog) throws SQLException {
        session.call(objectName, "setCatalog", new Object[] {catalog}, false );
} public void setReadOnly(boolean readOnly) throws SQLException {
        session.call(objectName, "setReadOnly", new Object[] {new
Boolean(readOnly)}, false );
} public void setTransactionIsolation(int level) throws SQLException {
        session.call(objectName, "setTransactionIsolation", new Object[] {new
Integer(level)}, false );
}

HTTPJDBCSession getHTTPJDBCSession() { return session; } public Statement createStatement(int resultSetType, int resultSetConcurrency) throws
SQLException {
    return null;
}
public PreparedStatement prepareStatement(String sql, int resultSetType, int
resultSetConcurrency) throws SQLException {
    return null;
} public CallableStatement prepareCall(String sql, int resultSetType, int
resultSetConcurrency) throws SQLException {
    return null;
} public void setTypeMap(Map map) throws SQLException { } public Map getTypeMap() throws SQLException {
    return null;
}
```

```
public String getSessionID(){
  return session.getID();
} public void finalize(){
  System.out.println("Closing connection");
  try{
    if (!isClosed()){
      close();
    }
  } catch(SQLException sqle){
    sqle.printStackTrace();
  }
}
}
```

Class HTTPJDBCDatabaseMetadata package com.VSDV.HTTPJDBC.Client;

import java.sql.*;

import com.VSDV.HTTPJDBC.Common.*;

```
public class HTTPJDBCDatabaseMetaData extends JDBCStub implements DatabaseMetaData { private HTTPJDBCSession session;
  private HTTPJDBCConnection connection;

public HTTPJDBCDatabaseMetaData(HTTPJDBCConnection connection, String objectName) {
    super(objectName);
    this.connection = connection;
    session = connection.getHTTPJDBCSession();
  } public boolean allProceduresAreCallable() throws SQLException{
        return ((Boolean)session.call(objectName, "allProceduresAreCallable", true)).booleanValue();
        } public boolean allTablesAreSelectable() throws SQLException{
        return ((Boolean)session.call(objectName, "allTablesAreSelectable", true)).booleanValue();
        } public String getURL() throws SQLException{
        return (String)session.call(objectName, "getURL", true);
        } public String getUserName() throws SQLException{
        return (String)session.call(objectName, "getUserName", true);
        } public boolean isReadOnly() throws SQLException{
        return ((Boolean)session.call(objectName, "getUserName", true)).booleanValue();
        } public boolean nullsAreSortedHigh() throws SQLException{
```

```
        return ((Boolean)session.call(objectName, "nullsAreSortedHigh",
true)).booleanValue();
    } public boolean nullsAreSortedLow() throws SQLException{
        return ((Boolean)session.call(objectName, "nullsAreSortedLow",
true)).booleanValue();
    } public boolean nullsAreSortedAtStart() throws SQLException{
        return ((Boolean)session.call(objectName, "nullsAreSortedAtStart",
true)).booleanValue();
    } public boolean nullsAreSortedAtEnd() throws SQLException{
        return ((Boolean)session.call(objectName, "nullsAreSortedAtEnd",
true)).booleanValue();
    } public String getDatabaseProductName() throws SQLException{
        return (String)session.call(objectName, "getDatabaseProductName", true);
    } public String getDatabaseProductVersion() throws SQLException{
        return (String)session.call(objectName, "getDatabaseProductVersion", true);
    } public String getDriverName() throws SQLException{
        return (String)session.call(objectName, "getDriverName", true);
    } public String getDriverVersion() throws SQLException{
        return (String)session.call(objectName, "getDriverVersion", true);
    } public int getDriverMajorVersion(){
        return 1;
    } public int getDriverMinorVersion(){
        return 0;
    } public boolean usesLocalFiles() throws SQLException{
        return ((Boolean)session.call(objectName, "usesLocalFiles",
true)).booleanValue();
```

```
} public boolean usesLocalFilePerTable() throws SQLException{
		return ((Boolean)session.call(objectName, "usesLocalFilePerTable",
true)).booleanValue();
	} public boolean supportsMixedCaseIdentifiers() throws SQLException{
		return ((Boolean)session.call(objectName, "supportsMixedCaseIdentifiers",
true)).booleanValue();
	} public boolean storesUpperCaseIdentifiers() throws SQLException{
		return ((Boolean)session.call(objectName, "storesUpperCaseIdentifiers",
true)).booleanValue();
	} public boolean storesLowerCaseIdentifiers() throws SQLException{
		return ((Boolean)session.call(objectName, "storesLowerCaseIdentifiers",
true)).booleanValue();
	} public boolean storesMixedCaseIdentifiers() throws SQLException{
		return ((Boolean)session.call(objectName, "storesMixedCaseIdentifiers",
true)).booleanValue();
	} public boolean supportsMixedCaseQuotedIdentifiers() throws SQLException{
		return ((Boolean)session.call(objectName,
"supportsMixedCaseQuotedIdentifiers", true)).booleanValue();
	} public boolean storesUpperCaseQuotedIdentifiers() throws SQLException{
		return ((Boolean)session.call(objectName, "storesLowerCaseIdentifiers",
true)).booleanValue();
	} public boolean storesLowerCaseQuotedIdentifiers() throws SQLException{
		return ((Boolean)session.call(objectName, "storesUpperCaseQuotedIdentifiers",
true)).booleanValue();
	} public boolean storesMixedCaseQuotedIdentifiers() throws SQLException{
		return ((Boolean)session.call(objectName, "storesMixedCaseQuotedIdentifiers",
true)).booleanValue();
	}
```

```
        public String getIdentifierQuoteString() throws SQLException{
            return (String)session.call(objectName, "getIdentifierQuoteString", true);
        } public String getSQLKeywords() throws SQLException{
            return (String)session.call(objectName, "getSQLKeywords", true);
        } public String getNumericFunctions() throws SQLException{
            return (String)session.call(objectName, "getNumericFunctions", true);
        } public String getStringFunctions() throws SQLException{
            return (String)session.call(objectName, "getStringFunctions", true);
        } public String getSystemFunctions() throws SQLException{
            return (String)session.call(objectName, "getSystemFunctions", true);
        } public String getTimeDateFunctions() throws SQLException{
            return (String)session.call(objectName, "getTimeDateFunctions", true);
        } public String getSearchStringEscape() throws SQLException{
            return (String)session.call(objectName, "getSearchStringEscape", true);
        } public String getExtraNameCharacters() throws SQLException{
            return (String)session.call(objectName, "getExtraNameCharacters", true);
        } public boolean supportsAlterTableWithAddColumn() throws SQLException{
            return ((Boolean)session.call(objectName, "storesLowerCaseIdentifiers",
true)).booleanValue();
        } public boolean supportsAlterTableWithDropColumn() throws SQLException{
            return ((Boolean)session.call(objectName, "supportsAlterTableWithAddColumn",
true)).booleanValue();
        } public boolean supportsColumnAliasing() throws SQLException{
            return ((Boolean)session.call(objectName, "supportsColumnAliasing",
true)).booleanValue();
```

```
} public boolean nullPlusNonNullIsNull() throws SQLException{
            return ((Boolean)session.call(objectName, "nullPlusNonNullIsNull",
true)).booleanValue();
        } public boolean supportsConvert() throws SQLException{
            return ((Boolean)session.call(objectName, "supportsConvert",
true)).booleanValue();
        } public boolean supportsConvert(int fromType, int toType) throws
SQLException{
            return ((Boolean)session.call(objectName, "supportsConvert",
true)).booleanValue();
        } public boolean supportsTableCorrelationNames() throws SQLException{
            return ((Boolean)session.call(objectName, "supportsTableCorrelationNames",
true)).booleanValue();
        } public boolean supportsDifferentTableCorrelationNames() throws
SQLException{
            return ((Boolean)session.call(objectName,
"supportsDifferentTableCorrelationNames", true)).booleanValue();
        } public boolean supportsExpressionsInOrderBy() throws SQLException{
            return ((Boolean)session.call(objectName, "supportsExpressionsInOrderBy",
true)).booleanValue();
        } public boolean supportsOrderByUnrelated() throws SQLException{
            return ((Boolean)session.call(objectName, "supportsOrderByUnrelated",
true)).booleanValue();
        } public boolean supportsGroupBy() throws SQLException{
            return ((Boolean)session.call(objectName, "supportsGroupBy",
true)).booleanValue();
        } public boolean supportsGroupByUnrelated() throws SQLException{
```

```
        return ((Boolean)session.call(objectName, "supportsGroupByUnrelated",
true)).booleanValue();
    } public boolean supportsGroupByBeyondSelect() throws SQLException{
            return ((Boolean)session.call(objectName, "supportsGroupByBeyondSelect",
true)).booleanValue();
    } public boolean supportsLikeEscapeClause() throws SQLException{
            return ((Boolean)session.call(objectName, "supportsLikeEscapeClause",
true)).booleanValue();
    } public boolean supportsMultipleResultSets() throws SQLException{
            return ((Boolean)session.call(objectName, "supportsMultipleResultSets",
true)).booleanValue();
    } public boolean supportsMultipleTransactions() throws SQLException{
            return ((Boolean)session.call(objectName, "supportsMultipleTransactions",
true)).booleanValue();
    } public boolean supportsNonNullableColumns() throws SQLException{
            return ((Boolean)session.call(objectName, "supportsNonNullableColumns",
true)).booleanValue();
    } public boolean supportsMinimumSQLGrammar() throws SQLException{
            return ((Boolean)session.call(objectName, "supportsMinimumSQLGrammar",
true)).booleanValue();
    } public boolean supportsCoreSQLGrammar() throws SQLException{
            return ((Boolean)session.call(objectName, "supportsCoreSQLGrammar",
true)).booleanValue();
    } public boolean supportsExtendedSQLGrammar() throws SQLException{
            return ((Boolean)session.call(objectName, "supportsExtendedSQLGrammar",
true)).booleanValue();
    } public boolean supportsANSI92EntryLevelSQL() throws SQLException{
```

```
        return ((Boolean)session.call(objectName, "supportsANSI92EntryLevelSQL",
true)).booleanValue();
    } public boolean supportsANSI92IntermediateSQL() throws SQLException{
        return ((Boolean)session.call(objectName, "supportsANSI92IntermediateSQL",
true)).booleanValue();
    } public boolean supportsANSI92FullSQL() throws SQLException{
        return ((Boolean)session.call(objectName, "supportsANSI92FullSQL",
true)).booleanValue();
    } public boolean supportsIntegrityEnhancementFacility() throws SQLException{
        return ((Boolean)session.call(objectName,
"supportsIntegrityEnhancementFacility", true)).booleanValue();
    } public boolean supportsOuterJoins() throws SQLException{
        return ((Boolean)session.call(objectName, "supportsOuterJoins",
true)).booleanValue();
    } public boolean supportsFullOuterJoins() throws SQLException{
        return ((Boolean)session.call(objectName, "supportsFullOuterJoins",
true)).booleanValue();
    } public boolean supportsLimitedOuterJoins() throws SQLException{
        return ((Boolean)session.call(objectName, "supportsLimitedOuterJoins",
true)).booleanValue();
    } public String getSchemaTerm() throws SQLException{
        return (String)session.call(objectName, "getSchemaTerm", true);
    } public String getProcedureTerm() throws SQLException{
        return (String)session.call(objectName, "getProcedureTerm", true);
```

```
        } public String getCatalogTerm() throws SQLException{
            return (String)session.call(objectName, "getCatalogTerm", true);
        } public boolean isCatalogAtStart() throws SQLException{
            return ((Boolean)session.call(objectName, "isCatalogAtStart",
true)).booleanValue();
        } public String getCatalogSeparator() throws SQLException{
            return (String)session.call(objectName, "getCatalogSeparator", true);
        } public boolean supportsSchemasInDataManipulation() throws SQLException{
            return ((Boolean)session.call(objectName,
"supportsSchemasInDataManipulation", true)).booleanValue();
        } public boolean supportsSchemasInProcedureCalls() throws SQLException{
            return ((Boolean)session.call(objectName, "supportsSchemasInProcedureCalls",
true)).booleanValue();
        } public boolean supportsSchemasInTableDefinitions() throws SQLException{
            return ((Boolean)session.call(objectName, "supportsSchemasInTableDefinitions",
true)).booleanValue();
        } public boolean supportsSchemasInIndexDefinitions() throws SQLException{
            return ((Boolean)session.call(objectName, "supportsSchemasInIndexDefinitions",
true)).booleanValue();
        } public boolean supportsSchemasInPrivilegeDefinitions() throws SQLException{
            return ((Boolean)session.call(objectName,
"supportsSchemasInPrivilegeDefinitions", true)).booleanValue();
        } public boolean supportsCatalogsInDataManipulation() throws SQLException{
```

```java
        return ((Boolean)session.call(objectName,
"supportsCatalogsInDataManipulation", true)).booleanValue();
    } public boolean supportsCatalogsInProcedureCalls() throws SQLException{
        return ((Boolean)session.call(objectName, "supportsCatalogsInProcedureCalls",
true)).booleanValue();
    } public boolean supportsCatalogsInTableDefinitions() throws SQLException{
        return ((Boolean)session.call(objectName, "supportsCatalogsInTableDefinitions",
true)).booleanValue();
    } public boolean supportsCatalogsInIndexDefinitions() throws SQLException{
        return ((Boolean)session.call(objectName, "supportsCatalogsInIndexDefinitions",
true)).booleanValue();
    } public boolean supportsCatalogsInPrivilegeDefinitions() throws SQLException{
        return ((Boolean)session.call(objectName,
"supportsCatalogsInPrivilegeDefinitions", true)).booleanValue();
    } public boolean supportsPositionedDelete() throws SQLException{
        return ((Boolean)session.call(objectName, "supportsPositionedDelete",
true)).booleanValue();
    } public boolean supportsPositionedUpdate() throws SQLException{
        return ((Boolean)session.call(objectName, "supportsPositionedUpdate",
true)).booleanValue();
    } public boolean supportsSelectForUpdate() throws SQLException{
        return ((Boolean)session.call(objectName, "supportsSelectForUpdate",
true)).booleanValue();
    }
```

```java
public boolean supportsStoredProcedures() throws SQLException{
    return ((Boolean)session.call(objectName, "supportsStoredProcedures",
true)).booleanValue();
} public boolean supportsSubqueriesInComparisons() throws SQLException{
    return ((Boolean)session.call(objectName,
"supportsSubqueriesInComparisons",true)).booleanValue();
} public boolean supportsSubqueriesInExists() throws SQLException{
    return ((Boolean)session.call(objectName, "supportsSubqueriesInExists",
true)).booleanValue();
} public boolean supportsSubqueriesInIns() throws SQLException{
    return ((Boolean)session.call(objectName, "supportsSubqueriesInIns",
true)).booleanValue();
} public boolean supportsSubqueriesInQuantifieds() throws SQLException{
    return ((Boolean)session.call(objectName, "supportsSubqueriesInQuantifieds",
true)).booleanValue();
} public boolean supportsCorrelatedSubqueries() throws SQLException{
    return ((Boolean)session.call(objectName, "supportsCorrelatedSubqueries",
true)).booleanValue();
} public boolean supportsUnion() throws SQLException{
    return ((Boolean)session.call(objectName, "supportsUnion",
true)).booleanValue();
} public boolean supportsUnionAll() throws SQLException{
    return ((Boolean)session.call(objectName, "supportsUnionAll",
true)).booleanValue();
} public boolean supportsOpenCursorsAcrossCommit() throws SQLException{
```

```
        return ((Boolean)session.call(objectName,
"supportsOpenCursorsAcrossCommit", true)).booleanValue();
    } public boolean supportsOpenCursorsAcrossRollback() throws SQLException{
        return ((Boolean)session.call(objectName,
"supportsOpenCursorsAcrossRollback", true)).booleanValue();
    } public boolean supportsOpenStatementsAcrossCommit() throws SQLException{
        return ((Boolean)session.call(objectName,
"supportsOpenStatementsAcrossCommit", true)).booleanValue();
    } public boolean supportsOpenStatementsAcrossRollback() throws SQLException{
        return ((Boolean)session.call(objectName,
"supportsOpenStatementsAcrossRollback", true)).booleanValue();
    } public int getMaxBinaryLiteralLength() throws SQLException{
        return ((Integer)session.call(objectName, "getMaxBinaryLiteralLength",
true)).intValue();
    } public int getMaxCharLiteralLength() throws SQLException{
        return ((Integer)session.call(objectName, "getMaxCharLiteralLength",
true)).intValue();
    } public int getMaxColumnNameLength() throws SQLException{
        return ((Integer)session.call(objectName, "getMaxColumnNameLength",
true)).intValue();
    } public int getMaxColumnsInGroupBy() throws SQLException{
        return ((Integer)session.call(objectName, "getMaxColumnsInGroupBy",
true)).intValue();
    } public int getMaxColumnsInIndex() throws SQLException{
        return ((Integer)session.call(objectName, "getMaxColumnsInIndex",
true)).intValue();
    } public int getMaxColumnsInOrderBy() throws SQLException{
```

```
    return ((Integer)session.call(objectName, "getMaxColumnsInOrderBy",
true)).intValue();
} public int getMaxColumnsInSelect() throws SQLException{
    return ((Integer)session.call(objectName, "getMaxColumnsInSelect",
true)).intValue();
} public int getMaxColumnsInTable() throws SQLException{
    return ((Integer)session.call(objectName, "getMaxColumnsInTable",
true)).intValue();
} public int getMaxConnections() throws SQLException{
    return ((Integer)session.call(objectName, "getMaxConnections", true)).intValue();
} public int getMaxCursorNameLength() throws SQLException{
    return ((Integer)session.call(objectName, "getMaxCursorNameLength",
true)).intValue();
} public int getMaxIndexLength() throws SQLException{
    return ((Integer)session.call(objectName, "getMaxIndexLength",
true)).intValue();
} public int getMaxSchemaNameLength() throws SQLException{
    return ((Integer)session.call(objectName, "getMaxSchemaNameLength",
true)).intValue();
} public int getMaxProcedureNameLength() throws SQLException{
    return ((Integer)session.call(objectName, "getMaxProcedureNameLength",
true)).intValue();
} public int getMaxCatalogNameLength() throws SQLException{
    return ((Integer)session.call(objectName, "getMaxCatalogNameLength",
true)).intValue();
} public int getMaxRowSize() throws SQLException{
    return ((Integer)session.call(objectName, "getMaxRowSize", true)).intValue();
}
```

```java
        public boolean doesMaxRowSizeIncludeBlobs() throws SQLException{
            return ((Boolean)session.call(objectName, "doesMaxRowSizeIncludeBlobs",
true)).booleanValue();
        } public int getMaxStatementLength() throws SQLException{
            return ((Integer)session.call(objectName, "getMaxStatementLength",
true)).intValue();
        } public int getMaxStatements() throws SQLException{
            return ((Integer)session.call(objectName, "getMaxStatementLength",
true)).intValue();
        } public int getMaxTableNameLength() throws SQLException{
            return ((Integer)session.call(objectName, "getMaxStatementLength",
true)).intValue();
        } public int getMaxTablesInSelect() throws SQLException{
            return ((Integer)session.call(objectName, "getMaxStatementLength",
true)).intValue();
        } public int getMaxUserNameLength() throws SQLException{
            return ((Integer)session.call(objectName, "getMaxStatementLength",
true)).intValue();
        } public int getDefaultTransactionIsolation() throws SQLException{
            return ((Integer)session.call(objectName, "getMaxStatementLength",
true)).intValue();
        } public boolean supportsTransactions() throws SQLException{
            return ((Boolean)session.call(objectName, "getMaxStatementLength",
true)).booleanValue();
        } public boolean supportsTransactionIsolationLevel(int level) throws
SQLException{
            return ((Boolean)session.call(objectName, "getMaxStatementLength",
true)).booleanValue();
        }
```

```java
        public boolean supportsDataDefinitionAndDataManipulationTransactions()
throws SQLException{
        return ((Boolean)session.call(objectName, "getMaxStatementLength",
true)).booleanValue();
    } public boolean supportsDataManipulationTransactionsOnly() throws
SQLException{
        return ((Boolean)session.call(objectName, "getMaxStatementLength",
true)).booleanValue();
    } public boolean dataDefinitionCausesTransactionCommit() throws
SQLException{
        return ((Boolean)session.call(objectName, "getMaxStatementLength",
true)).booleanValue();
    } public boolean dataDefinitionIgnoredInTransactions() throws SQLException{
        return ((Boolean)session.call(objectName, "getMaxStatementLength",
true)).booleanValue();
    } public ResultSet getProcedures(String catalog, String schemaPattern, String
procedureNamePattern) throws SQLException{
        return (ResultSet)session.call(objectName, "getProcedures", new Object[] {
catalog, schemaPattern, procedureNamePattern}, true);
    } public ResultSet getProcedureColumns(String catalog, String schemaPattern,
String procedureNamePattern, String columnNamePattern) throws SQLException{
        return (ResultSet)session.call(objectName, "getProcedureColumns", new Object[]
{ catalog, schemaPattern, procedureNamePattern, columnNamePattern}, true);
    } public ResultSet getTables(String catalog, String schemaPattern, String
tableNamePattern, String types[]) throws SQLException{
        return (ResultSet)session.call(objectName, "getTables", new Object[] {catalog,
schemaPattern, tableNamePattern, types}, true);
    } public ResultSet getSchemas() throws SQLException{
        return (ResultSet)session.call(objectName, "getSchemas", true);
    }
```

```java
    public ResultSet getCatalogs() throws SQLException{
        return (ResultSet)session.call(objectName, "getCatalogs", true);
} public ResultSet getTableTypes() throws SQLException{
        return (ResultSet)session.call(objectName, "getTableTypes", true);
} public ResultSet getColumns(String catalog, String schemaPattern, String tableNamePattern, String columnNamePattern) throws SQLException{
        return (ResultSet)session.call(objectName, "getColumns", new Object[]{catalog, schemaPattern, tableNamePattern, columnNamePattern}, true);
} public ResultSet getColumnPrivileges(String catalog, String schema,String table, String columnNamePattern) throws SQLException{
        return (ResultSet)session.call(objectName, "getColumnPrivileges", new Object[]{catalog, schema, table, columnNamePattern}, true);
} public ResultSet getTablePrivileges(String catalog, String schemaPattern, String tableNamePattern) throws SQLException{
        return (ResultSet)session.call(objectName, "getTablePrivileges", new Object[]{catalog, schemaPattern, tableNamePattern}, true);
} public ResultSet getBestRowIdentifier(String catalog, String schema, String table, int scope, boolean nullable) throws SQLException{
        return (ResultSet)session.call(objectName, "getBestRowIdentifier", new Object[]{catalog, schema, table, new Integer(scope), new Boolean(nullable)}, true);
} public ResultSet getVersionColumns(String catalog, String schema, String table) throws SQLException{
        return (ResultSet)session.call(objectName, "getVersionColumns", new Object[]{catalog, schema, table}, true);
} public ResultSet getPrimaryKeys(String catalog, String schema, String table) throws SQLException{
        return (ResultSet)session.call(objectName, "getPrimaryKeys", new Object[]{catalog, schema, table}, true);
} public ResultSet getImportedKeys(String catalog, String schema, String table) throws SQLException{
```

25

```
        return (ResultSet)session.call(objectName, "getImportedKeys", new Object[]
{catalog, schema, table}, true);
    } public ResultSet getExportedKeys(String catalog, String schema, String table)
throws SQLException{
        return (ResultSet)session.call(objectName, "getExportedKeys", new Object[]
{catalog, schema, table}, true);
    } public ResultSet getCrossReference( String primaryCatalog, String
primarySchema, String primaryTable, String foreignCatalog, String foreignSchema,
String foreignTable) throws SQLException{
        return (ResultSet)session.call(objectName, "getCrossReference", new Object[]
{primaryCatalog, primarySchema, primaryTable, foreignSchema, foreignTable}, true);
    } public ResultSet getTypeInfo() throws SQLException{
        return (ResultSet)session.call(objectName, "getTypeInfo", true);
    } public ResultSet getIndexInfo(String catalog, String schema, String table, boolean
unique, boolean approximate) throws SQLException{
        return (ResultSet)session.call(objectName, "getIndexInfo", new Object[]{catalog,
schema, table, new Boolean(unique), new Boolean(approximate)}, true);
    } public boolean supportsResultSetType(int type) throws SQLException{
        return ((Boolean)session.call(objectName, "supportsResultSetType", new
Object[]{new Integer(type)}, true)).booleanValue();
    } public boolean supportsResultSetConcurrency(int type, int concurrency) throws
SQLException{
        return ((Boolean)session.call(objectName, "supportsResultSetConcurrency", new
Object[]{new Integer(type), new Integer(concurrency)}, true)).booleanValue();
    } public boolean ownUpdatesAreVisible(int type) throws SQLException{
        return ((Boolean)session.call(objectName, "ownUpdatesAreVisible", new
Object[]{new Integer(type)}, true)).booleanValue();
    } public boolean ownDeletesAreVisible(int type) throws SQLException{
        return ((Boolean)session.call(objectName, "ownDeletesAreVisible", new
Object[]{new Integer(type)}, true)).booleanValue();
```

}

```java
public boolean ownInsertsAreVisible(int type) throws SQLException{
        return ((Boolean)session.call(objectName, "ownInsertsAreVisible", new Object[]{new Integer(type)}, true)).booleanValue();
} public boolean othersUpdatesAreVisible(int type) throws SQLException{
        return ((Boolean)session.call(objectName, "othersUpdatesAreVisible", new Object[]{new Integer(type)}, true)).booleanValue();
} public boolean othersDeletesAreVisible(int type) throws SQLException{
        return ((Boolean)session.call(objectName, "othersDeletesAreVisible", new Object[]{new Integer(type)}, true)).booleanValue();
} public boolean othersInsertsAreVisible(int type) throws SQLException{
        return ((Boolean)session.call(objectName, "othersInsertsAreVisible", new Object[]{new Integer(type)}, true)).booleanValue();
} public boolean updatesAreDetected(int type) throws SQLException{
        return ((Boolean)session.call(objectName, "updatesAreDetected", new Object[]{new Integer(type)}, true)).booleanValue();
} public boolean deletesAreDetected(int type) throws SQLException{
        return ((Boolean)session.call(objectName, "deletesAreDetected", new Object[]{new Integer(type)}, true)).booleanValue();
} public boolean insertsAreDetected(int type) throws SQLException{
        return ((Boolean)session.call(objectName, "insertsAreDetected", new Object[]{new Integer(type)}, true)).booleanValue();
} public boolean supportsBatchUpdates() throws SQLException{
        return ((Boolean)session.call(objectName, "supportsBatchUpdates", true)).booleanValue();
} public ResultSet getUDTs(String catalog, String schemaPattern, String typeNamePattern, int[] types) throws SQLException{
        return (ResultSet)session.call(objectName, "getUDTs", new Object[]{ catalog, schemaPattern, typeNamePattern, types}, true);
```

27

}

```
public Connection getConnection() throws SQLException{
    return connection;
}
}
```

Class HTTPJDBCDriver

```java
package com.VSDV.HTTPJDBC.Client;

import java.sql.*;
import java.util.*;

import com.VSDV.HTTPJDBC.Common.*;
import com.VSDV.Global.*;

/**
 * Generic JDBC driver for tunneling all JDBC call over HTTP
 */
public class HTTPJDBCDriver implements Driver { private static HTTPJDBCDriver driver = new HTTPJDBCDriver();
  private HTTPJDBCSession session;

public HTTPJDBCDriver() {
    try {
    Globals globals = Globals.getInstance();
    session = new HTTPJDBCSession(globals.getWebHost(), globals.getHttpPort(), false);
    DriverManager.registerDriver(this);
        } catch (Exception ex) { ex.printStackTrace(); }
  }

/**
   * Connects to servlet creates session
   * servlet in turn creates real JDBC connection
   * If there is a problem on the servlet side we wrap
   * it's exception in an SQLException
   */
  public Connection connect(String url,
                Properties info)
            throws SQLException {
        StringTokenizer tokenizer = new StringTokenizer(url, ":");
        String protocol = tokenizer.nextToken();
        String host = tokenizer.nextToken();
        int port = Integer.parseInt(tokenizer.nextToken() );
        boolean secure = false;
        if (protocol.equals("httpjdbc") )
          secure = false;
        else if (protocol.equals("httpsjdbc") ) {
    secure = true;
        }
```

```java
    String objectName = (String)session.call("driver", "connect", new Object[] {url, info},
true );
        HTTPJDBCConnection con = new HTTPJDBCConnection(session, objectName);
            return con;
} public boolean acceptsURL(String url) throws SQLException {
    StringTokenizer tokenizer = new StringTokenizer(url, ":");
        String a = tokenizer.nextToken();
        if (a.equals("httpjdbc") )
          return true;
        else if (a.equals("httpsjdbc") )
          return true;
        else
          return false;
} public DriverPropertyInfo[] getPropertyInfo(String url,
                            Properties info) throws SQLException {
        return null;
} public int getMajorVersion() { return 1; } public int getMinorVersion() { return 1; } public boolean jdbcCompliant() { return true; }
}
```

Class HTTPJDBCPreparedStatement

```
package com.VSDV.HTTPJDBC.Client;

import java.sql.*;
import java.math.*;
import java.io.*;
import java.util.*;

import com.VSDV.HTTPJDBC.Common.*;

public class HTTPJDBCPreparedStatement extends HTTPJDBCStatement implements
PreparedStatement { public HTTPJDBCPreparedStatement(HTTPJDBCConnection con, Object[]
parameters) {
    super(con, parameters);
  } public void initializeStatement(HTTPJDBCConnection con, Object[] parameters){
    InObject defaultMethodObject = new InObject(con.getName(), "", parameters, true);
    defaultMethodObject.setMethod("prepareStatement");
    addToMethodList(defaultMethodObject);
  } public ResultSet executeQuery() throws SQLException {
    checkForClosed();
        InObject inObject = new InObject(objectName, "executeQuery", true);
    addToMethodList(inObject);
    ResultSet rset = (ResultSet)makeCall();
    return rset;
  } public int executeUpdate() throws SQLException {
    checkForClosed();
        InObject inObject = new InObject(objectName, "executeUpdate", true);
    addToMethodList(inObject);
    Integer i = (Integer)makeCall();
    return i.intValue();
  } public boolean execute() throws SQLException {
    checkForClosed();
        InObject inObject = new InObject(objectName, "execute", true);
    addToMethodList(inObject);
```

```
    Boolean b = (Boolean)makeCall();
    return b.booleanValue();
} public void setNull(int parameterIndex, int sqlType) throws SQLException {
    InObject inObject = new InObject(objectName, "setNull", new Object[] {new
Integer(parameterIndex), new Integer(sqlType)}, false);
    addToMethodList(inObject);
} public void setBoolean(int parameterIndex, boolean x) throws SQLException {
    InObject inObject = new InObject(objectName, "setBoolean", new Object[] {new
Integer(parameterIndex), new Boolean(x)}, false );
    addToMethodList(inObject);
} public void setByte(int parameterIndex, byte x) throws SQLException {
    InObject inObject = new InObject(objectName, "setByte", new Object[] {new
Integer(parameterIndex), new Byte(x)}, false );
    addToMethodList(inObject);
} public void setShort(int parameterIndex, short x) throws SQLException {
    InObject inObject = new InObject(objectName, "setShort", new Object[] {new
Integer(parameterIndex), new Short(x)}, false );
    addToMethodList(inObject);
} public void setInt(int parameterIndex, int x) throws SQLException {
    InObject inObject = new InObject(objectName, "setInt", new Object[] {new
Integer(parameterIndex), new Integer(x)}, false );
    addToMethodList(inObject);
} public void setLong(int parameterIndex, long x) throws SQLException {
    InObject inObject = new InObject(objectName, "setLong", new Object[] {new
Integer(parameterIndex), new Long(x)}, false );
    addToMethodList(inObject);
} public void setFloat(int parameterIndex, float x) throws SQLException {
    InObject inObject = new InObject(objectName, "setFloat", new Object[] {new
Integer(parameterIndex), new Float(x)}, false );
    addToMethodList(inObject);
}
```

```java
public void setDouble(int parameterIndex, double x) throws SQLException {
  InObject inObject = new InObject(objectName, "setDouble", new Object[] {new Integer(parameterIndex), new Double(x)}, false );
  addToMethodList(inObject);
} public void setBigDecimal(int parameterIndex, BigDecimal x) throws SQLException {
  InObject inObject = new InObject(objectName, "setBigDecimal", new Object[] {new Integer(parameterIndex), x}, false );
  addToMethodList(inObject);
} public void setString(int parameterIndex, String x) throws SQLException {
  // To be compatible with earlier drivers. By specs we should use setNull()
  if (x == null){
    setNull(parameterIndex, Types.VARCHAR);
    return;
  }
      InObject inObject = new InObject(objectName, "setString", new Object[] {new Integer(parameterIndex), x}, false );
  addToMethodList(inObject);
} public void setBytes(int parameterIndex, byte x[]) throws SQLException {
  InObject inObject = new InObject(objectName, "setBytes", new Object[] {new Integer(parameterIndex), x}, false );
  addToMethodList(inObject);
} public void setDate(int parameterIndex, java.sql.Date x) throws SQLException {
  InObject inObject = new InObject(objectName, "setDate", new Object[] {new Integer(parameterIndex), x}, false );
  addToMethodList(inObject);
} public void setTime(int parameterIndex, java.sql.Time x) throws SQLException {
  InObject inObject = new InObject(objectName, "setTime", new Object[] {new Integer(parameterIndex), x}, false );
  addToMethodList(inObject);
} public void setTimestamp(int parameterIndex, java.sql.Timestamp x) throws SQLException {
  InObject inObject = new InObject(objectName, "setTimestamp", new Object[] {new Integer(parameterIndex), x}, false );
  addToMethodList(inObject);
```

}

```
public void setAsciiStream(int parameterIndex, InputStream input, int length) throws SQLException{
    int i = 0;
    byte bytes[];
    try {
        bytes = new byte[input.available()];
        input.read(bytes);
        input.close();
    }catch(IOException ioe){
        throw new SQLException("Unable to set the Ascii stream to the statement");
    }
    InObject inObject = new InObject(objectName, "setAsciiStream", new Object[] { new Integer(parameterIndex), bytes, new Integer(length)}, false);
    addToMethodList(inObject);
} public void setUnicodeStream(int parameterIndex, InputStream input, int length)throws SQLException{
    int i = 0;
    byte bytes[];
    try{
        bytes = new byte[input.available()];
        input.read(bytes);
        input.close();
    }catch(IOException ioe){
        throw new SQLException("Unable to set the Unicode stream to the statement");
    }
    InObject inObject = new InObject(objectName, "setUnicodeStream", new Object[] {new Integer(parameterIndex), bytes, new Integer(length)}, false);
    addToMethodList(inObject);
} public void setBinaryStream(int parameterIndex, java.io.InputStream input, int length) throws SQLException {
    int i=0;
    int singleByte;
    byte[] bytes;
    try{
     bytes = new byte[input.available()];
     input.read(bytes);
     input.close();
    } catch(IOException ioe){
      throw new SQLException("Cannot set the binary stream to the statement");
```

```
    }
    InObject inObject = new InObject(objectName, "setBinaryStream", new Object[] {new
Integer(parameterIndex), bytes, new Integer(length)}, false);
    addToMethodList(inObject);
} public void clearParameters() throws SQLException {
    session.call(objectName, "clearParameters", false);
} public void setObject(int parameterIndex, Object x, int targetSqlType, int scale)throws
SQLException {
    Object[] params = new Object[] {new Integer(parameterIndex), x, new
Integer(targetSqlType), new Integer(scale) };
    Class[] paramTypes = new Class[] {Integer.class, Object.class, Integer.class,
Integer.class};
    InObject inObject = new InObject(objectName, "setObject", params, paramTypes,
false);
    addToMethodList(inObject);
} public void setObject(int parameterIndex, Object x, int targetSqlType) throws
SQLException {
    Object[] params = new Object[] {new Integer(parameterIndex), x, new
Integer(targetSqlType)};
    Class[] paramTypes = new Class[] {Integer.class, Object.class, Integer.class};
    InObject inObject = new InObject(objectName, "setObject", params, paramTypes,
false);
    addToMethodList(inObject);
} public void setObject(int parameterIndex, Object x) throws SQLException {
        Object[] params = new Object[] {new Integer(parameterIndex), x};
    Class[] paramTypes = new Class[] {Integer.class, Object.class};
    InObject inObject = new InObject(objectName, "setObject", params, paramTypes,
false );
    addToMethodList(inObject);
}

// ************* JDBC 2.0 *********** public void addBatch() throws SQLException {
    addToMethodList(new InObject(objectName, "addBatch", true));
}
```

```java
public void setCharacterStream(int parameterIndex,
                java.io.Reader reader,
                int length ) throws SQLException {

} public void setRef (int i, Ref x) throws SQLException {

} public void setBlob (int i, Blob x) throws SQLException {

} public void setClob (int i, Clob x ) throws SQLException {

} public void setArray (int i, Array x ) throws SQLException {

} public ResultSetMetaData getMetaData() throws SQLException {
  return null;
} public void setDate(int parameterIndex, java.sql.Date x, Calendar cal) throws SQLException {

} public void setTime(int parameterIndex, java.sql.Time x, Calendar cal)
        throws SQLException {

} public void setTimestamp(int parameterIndex, java.sql.Timestamp x, Calendar cal)
        throws SQLException {
```

```
    } public void setNull (int paramIndex, int sqlType, String typeName) throws
SQLException {

}
}
```

Class HTPJDBCSession

```
package com.VSDV.HTTPJDBC.Client;

import java.io.*;
import java.sql.*;
import java.net.*;

import javax.swing.Timer;
import java.awt.event.*;
import java.applet.*;
import java.util.*;
import com.VSDV.HTTPJDBC.Common.*;

public class HTTPJDBCSession {

URL url, streamURL;
  Timer timer;
  private String sessionID;
  boolean secure;

public HTTPJDBCSession(String host, int port, boolean secure) {
    try {
      this.secure = secure;
      String secureStr = "http";
      if (secure)
        secureStr = "https";
      else
        secureStr = "http";
          url = new URL(secureStr, host, port, "/JDBCServlet");
          createSession();
    } catch (Exception ex) {
      ex.printStackTrace();
    }
  } public String getID(){
    return sessionID;
  } public void createSession() throws Exception {
    Hashtable hash = new Hashtable();
    hash.put("action", "createSession");
    InputStream input = doGet(url, hash);
        ObjectInputStream objInput = new ObjectInputStream(input);
```

```
        sessionID = (String)objInput.readObject();
        objInput.close();
} public InputStream doGet(URL u, Hashtable hash) throws Exception {
        String parameters = doGetParameters(hash);
    URL url = new URL(u.toString()+"?"+parameters);
    URLConnection urlConnection = url.openConnection();
    urlConnection.setDoInput(true);
    return urlConnection.getInputStream();
} private String doGetParameters(Hashtable hash) {
        String returnStr = "";
    Enumeration enum = hash.keys();
    while (enum.hasMoreElements() ) {
            String key = (String)enum.nextElement();
            String value = (String)hash.get(key);
       returnStr += key+"="+value+"&";
        }
        return returnStr;
} public InputStream doPost(URL url, byte[] data) throws IOException {
    URLConnection urlConnection = url.openConnection();
        urlConnection.setUseCaches(false);
    urlConnection.setRequestProperty("content-length", String.valueOf(data.length ) );
    urlConnection.setDoOutput(true);
    OutputStream out = new BufferedOutputStream(urlConnection.getOutputStream() );
    for (int x=0; x < data.length; x++) {
            out.write(data[x]);
        }
    out.close();
    return new BufferedInputStream(urlConnection.getInputStream() );
} public Object call(String objName, String method, boolean hasReturnValue) throws
SQLException {
    return call(objName, method, null,hasReturnValue);
} public Object call(String objName, String method, Object[] params, Class[]
paramTypes, boolean hasReturnValue) throws SQLException {
    InObject inObj = new InObject(sessionID, objName, method, params,
paramTypes,hasReturnValue);
```

```
    return makeCall(inObj);
} public Object call(String objName, String method, Object[] params, boolean
hasReturnValue) throws SQLException {
    InObject inObj = new InObject(sessionID, objName, method, params,
hasReturnValue);
    return makeCall(inObj);
} private Object makeCall(InObject inObject) throws SQLException {
    try {
            ByteArrayOutputStream byteOut = new ByteArrayOutputStream();
            ObjectOutputStream objOut = new ObjectOutputStream(byteOut);
             objOut.writeObject(inObject);
             byte[] paramData = byteOut.toByteArray();
      InputStream in=null;
      if (inObject.hasReturnValue( ) ){
        in = doPost(url, paramData);
        ObjectInputStream objIn = new ObjectInputStream(in);
        Object readObject = (Object)objIn.readObject();
        objIn.close();
                if (readObject instanceof NullObject) return null;
        if (readObject instanceof SQLException) {
                throw (SQLException)readObject;
            } else if (readObject instanceof Exception) {
                throw new SQLException( ((Exception)readObject).getMessage() );
        } else {
                return readObject;
        }
      } else {
        doPost(url, paramData);
        return null;
      }
        } catch (Exception ex) {
                ex.printStackTrace();
                throw new SQLException( ex.getMessage() );
        }
} public Class[] getParameterTypes(Object[] params) {
    if (params == null) return null;
    Class[] paramTypes = new Class[params.length];
        for (int x=0; x < paramTypes.length; x++) {
      Class c = params[x].getClass();
      paramTypes[x] = adjustIt(c);
```

```
        }
        return paramTypes;
} private Class adjustIt(Class c) {
  if (Integer.class.equals(c) ) return Integer.TYPE;
  else if (Boolean.class.equals(c) ) return Boolean.TYPE;
  else if (Character.class.equals(c) ) return Character.TYPE;
  else if (Byte.class.equals(c) ) return Byte.TYPE;
  else if (Short.class.equals(c) ) return Short.TYPE;
  else if (Long.class.equals(c) ) return Long.TYPE;
  else if (Float.class.equals(c) ) return Float.TYPE;
  else if (Double.class.equals(c) ) return Double.TYPE;
  else return c;
} public Object call(ArrayList methodList) throws SQLException{
  OutObject outObject = null;
  try {
                ByteArrayOutputStream byteOut = new ByteArrayOutputStream();
                ObjectOutputStream objOut = new ObjectOutputStream(byteOut);
                  objOut.writeObject(methodList);
                  byte[] paramData = byteOut.toByteArray();
    InputStream in=null;
    in = doPost(url, paramData);
    ObjectInputStream objIn = new ObjectInputStream(in);
    Object returnObject = objIn.readObject();
    objIn.close();
                if (returnObject instanceof NullObject){
      return null;
    }
    if( returnObject instanceof OutObject){
      outObject = (OutObject)returnObject;
    }
    if (returnObject instanceof SQLException) {
            throw (SQLException)returnObject;
    } else if (returnObject instanceof Exception) {
                  throw new SQLException(((Exception)returnObject).getMessage());
    } else {
                  return outObject;
    }
  } catch (Exception ex) {
                ex.printStackTrace();
                throw new SQLException( ex.getMessage() );
        }
}
```

}

Class HTTPJDBCStatement package com.VSDV.HTTPJDBC.Client;

import java.sql.*;
import java.util.*;

import com.VSDV.HTTPJDBC.Common.*;

```
/**
 * Implements remoted functionality for java.sql.Statement
 */
public class HTTPJDBCStatement extends JDBCStub implements Statement { protected HTTPJDBCConnection con;
  protected HTTPJDBCSession session;
  protected MethodList methodList = new MethodList();
  protected boolean closed = false;
  public HTTPJDBCStatement(HTTPJDBCConnection con) {
    this.con = con;
        session = con.getHTTPJDBCSession();
    initializeStatement(con, null);
  } public HTTPJDBCStatement(HTTPJDBCConnection con, Object[] parameters){
    this.con = con;
        session = con.getHTTPJDBCSession();
    initializeStatement(con, parameters);
  } public void initializeStatement(HTTPJDBCConnection con, Object[] parameters){
    InObject defaultMethodObject = new InObject(con.getName(), "", false);
    defaultMethodObject.setMethod("createStatement");
    addToMethodList(defaultMethodObject);
  } public ResultSet executeQuery(String sql) throws SQLException {
    checkForClosed();
    addToMethodList(new InObject(session.getID(), objectName, "executeQuery", new Object[] {sql}, true));
    ResultSet rset = (ResultSet)makeCall();
    return rset;
  } public ResultSet executeQueryAndClose(String sql) throws SQLException{
```

```
  checkForClosed();
  addToMethodList(new InObject(session.getID(), objectName, "executeQuery", new
Object[] {sql}, true));
  InObject inObject = new InObject(objectName, "close", false);
  addToMethodList(inObject);
  ResultSet rset = (ResultSet)makeCall();
  methodList.removeAll(methodList);
  closed = true;
  return rset;
} public void close() throws SQLException {
  session.call(objectName, "close", false);
  closed = true;
} public boolean executeAndClose(String sql) throws SQLException {
  checkForClosed();
  InObject inObject = new InObject(objectName, "execute", new Object[] {sql}, true );
  addToMethodList(inObject);
  Boolean b = (Boolean)makeCall();
  return b.booleanValue();
} public boolean execute(String sql) throws SQLException {
  checkForClosed();
  InObject inObject = new InObject(objectName, "execute", new Object[] {sql}, true );
  addToMethodList(inObject);
  Boolean b = (Boolean)makeCall();
  return b.booleanValue();
} protected void checkForClosed() throws SQLException{
  if (closed){
    throw new SQLException("Error : called method on a closed Statement");
  }
} protected Object makeCall() throws SQLException{
  OutObject resultObject = (OutObject)session.call(methodList);
  tagWithReferenceNameAndRefresh(resultObject.getName());
  return resultObject.getResultObject();
} private void tagWithReferenceNameAndRefresh(String name){
  setName(name);
```

44

```java
    methodList.setName(name);
    methodList.removeAll(methodList);
} public int executeUpdate(String sql) throws SQLException {
    checkForClosed();
    addToMethodList(new InObject(session.getID(), objectName, "executeUpdate", new
Object[] {sql}, true));
    Integer i = (Integer)makeCall();
        return i.intValue();
} public void setEscapeProcessing(boolean enable) throws SQLException {
        session.call(objectName, "setEscapeProcessing", new Object[] {new
Boolean(enable)}, false );
} public int getMaxFieldSize() throws SQLException {
        Integer i = (Integer)session.call(objectName, "getMaxFieldSize", true);
        return i.intValue();
} public void setMaxFieldSize(int max) throws SQLException {
    session.call(objectName, "setMaxFieldSize", new Object[] {new Integer(max)}, false);
} public int getMaxRows() throws SQLException {
    Integer i = (Integer)session.call(objectName, "getMaxRows", true );
        return i.intValue();
} public void setMaxRows(int max) throws SQLException {
    addToMethodList(new InObject(session.getID(), objectName, "setMaxRows", new
Object[] {new Integer(max)}, true));
} public int getQueryTimeout()throws SQLException {
    Integer i = (Integer)session.call(objectName, "getQueryTimeout",true);
        return i.intValue();
} public void setQueryTimeout(int seconds) throws SQLException {
        session.call(objectName, "setQueryTimeout", new Object[] {new
Integer(seconds)}, false );
}
```

```
public void cancel() throws SQLException {
        session.call(objectName, "cancel", false );
} public SQLWarning getWarnings() throws SQLException {
        return null;
}
public void clearWarnings() throws SQLException {

} public void setCursorName(String name) throws SQLException {
  session.call(objectName, "setCursorName", new Object[] {name}, false );
} public ResultSet getResultSet() throws SQLException {
  return null;
} public int getUpdateCount() throws SQLException {
        Integer i = (Integer)session.call(objectName, "getUpdateCount", true);
        return i.intValue();
} public boolean getMoreResults() throws SQLException {
  Boolean i = (Boolean)session.call(objectName, "getMoreResults", true );
        return i.booleanValue();
} public void setFetchDirection(int direction) throws SQLException {

} public int getFetchDirection() throws SQLException {
  return 1;
} public void setFetchSize(int rows) throws SQLException {
  addToMethodList(new InObject(session.getID(), objectName, "setFetchSize", new Object[] {new Integer(rows)}, true));
} public int getFetchSize() throws SQLException {
  return 1;
}
```

```java
public int getResultSetConcurrency() throws SQLException {
        return 1;
} public int getResultSetType() throws SQLException {
        return 1;
} public void addBatch(String sql) throws SQLException {
  addToMethodList(new InObject(objectName, "addBatch", new Object[] {sql}, true));
} public void clearBatch() throws SQLException {

} public int[] executeBatch() throws SQLException {
  addToMethodList(new InObject(objectName, "executeBatch", true));
  Object obj = makeCall();
  return new int[] {1, 2};
} public Connection getConnection() throws SQLException {
        return con;
}

HTTPJDBCConnection getHTTPJDBCConnection() {
  return con;
} protected void addToMethodList(InObject object){
  object.setSessionID(session.getID());
  methodList.add(object);
} public void finalize(){
  if(!closed){
    try{
      close();
    } catch(SQLException sqle){
      sqle.printStackTrace();
    }
   }
  }
 }
}
```

Class JDBCStub package com.VSDV.HTTPJDBC.Client;

import java.sql.*;

```
/**
 * Simple root class to be used for stuff like HTTPJDBCStatement etc.
 * Basically forces the child objects to use an object name
 */ public abstract class JDBCStub { public String objectName=null;

public JDBCStub(String objectName) {
        this.objectName = objectName;
  } public JDBCStub(){
  } public void setName(String name) {
        objectName = name;
  } public String getName(){
    return objectName;
  }
}
```

Common Classes Used by both the Server and Client

Class InObject ............................................................................................................ 2
Class MethodList ....................................................................................................... 6
Class NullObject ........................................................................................................ 7
Class OutObject ......................................................................................................... 8

Class InObject package com.VSDV.HTTPJDBC.Common;

import java.io.*;

```
/**
 * Object that is serialized containing information about which
 * object to call which method on with the method's parameters
 * It also contains the sessionId used by the server to allow
 * for sessions over HTTP
 * Cookies were originally used then abandoned because
 * the Java plugin did not seem to retrieve cookie data
 * from the servlet hence not passing it back upon subsequent
 * calls to the servlet
 */

/*
  To Do :
  1. Make this object much lighter.
  2. Let the servlet do the createInputStreamFromBytes
*/
public class InObject implements Serializable{ static final long serialVersionUID = 4064151811232982612L;
   public String method, objectName;
   public Object[] parameters;
   public Class[] parameterTypes = null;
   boolean returnsStream = false;
   String sessionId;
   boolean hasReturnValue;    // to avoid null return public InObject(String sessionId, String objectName, String method, Object[] parameters, boolean hasReturnValue) {   // to avoid null return
         this.sessionId = sessionId;
         this.objectName = objectName;
      this.hasReturnValue = hasReturnValue;
      this.method = method;
      this.parameters = parameters;
      if (parameters != null)
        this.parameterTypes = getTypes(parameters);
      else
```

```
    this.parameterTypes = null;
} public InObject(String sessionId, String objectName, String method,
        Object[] parameters, Class[] parameterTypes,
        boolean hasReturnValue ) {
  this(sessionId, objectName, method, parameters, hasReturnValue);
  this.parameterTypes = parameterTypes;
} public InObject(String objectName, String method, boolean hasReturnValue){
  this(null, objectName, method, null, hasReturnValue);
} public InObject(String objectName, String method, Object[] parameters, boolean hasReturnValue){
  this(null, objectName, method, parameters, hasReturnValue);
} public InObject(String objectName, String method, Object[] parameters, Class[] parameterTypes, boolean hasReturnValue ) {
  this(null, objectName, method, parameters, parameterTypes, hasReturnValue);
} public String getSessionId() { return sessionId; } public String getMethodName() { return method; } public String getObjectName() { return objectName; } public Object[] getParameters() {
  return parameters;
}

/* public void createInputStreamFromBytes(){
  if (!getMethodName().equals("setBinaryStream")){
    return;
  }
  if ( !(parameters[1] instanceof ByteArrayInputStream)){
    parameters[1] = getInputStreamFromBytes((byte[])parameters[1]);
    parameterTypes[1] = java.io.InputStream.class;
  }
}*/
public void createInputStreamFromBytes(){
```

```
if(getMethodName().equals("setBinaryStream") ||
getMethodName().equals("setAsciiStream") ||
getMethodName().equals("setUnicodeStream")){
   System.out.println("getMethodName : " + getMethodName());
   if(!(parameters[1] instanceof ByteArrayInputStream)){
     parameters[1] = getInputStreamFromBytes((byte[])parameters[1]);
     parameterTypes[1] = java.io.InputStream.class;
    }
  }
} public Class[] getParameterTypes() {
      return adjustThem(parameterTypes);
} public boolean hasReturnValue ( ){
 return  hasReturnValue ;
} private Class[] getTypes(Object[] params) {
      if (params == null) return null;
  Class[] classes = new Class[params.length];
  for (int x=0; x < params.length; x++) {
   classes[x] = params[x].getClass();
  }
      return classes;
} private Class[] adjustThem(Class[] classes) {
      if (classes == null) return null;
  for (int x=0; x < classes.length; x++) {
   classes[x] = adjustIt(classes[x]);
      }
      return classes;
} private Class adjustIt(Class c) {
  if (Integer.class.equals(c) ) return Integer.TYPE;
  else if (Boolean.class.equals(c) ) return Boolean.TYPE;
  else if (Character.class.equals(c) ) return Character.TYPE;
  else if (Byte.class.equals(c) ) return Byte.TYPE;
  else if (Short.class.equals(c) ) return Short.TYPE;
  else if (Long.class.equals(c) ) return Long.TYPE;
  else if (Float.class.equals(c) ) return Float.TYPE;
  else if (Double.class.equals(c) ) return Double.TYPE;
```

```
    else return c;
  } public boolean getReturnsStream() { return returnsStream; } public String toString(){
    return "Session : "+getSessionId()+" Object Name : "+getObjectName()+" "+getMethodName();
  } public void setSessionID(String sessionID){
    this.sessionId = sessionID;
  } public void setMethod(String method){
    this.method = method;
  } private InputStream getInputStreamFromBytes(byte[] bytes){
    return new ByteArrayInputStream(bytes);
  }
}
```

Class MethodList package com.VSDV.HTTPJDBC.Common;

import java.util.*;

```java
public class MethodList extends ArrayList{
  private String listName;
  public MethodList(){
  } public void setName(String name){
    listName = name;
  } public String getName(){
    return listName;
  }
}
```

Class NullObject package com.VSDV.HTTPJDBC.Common;

import java.io.*;

```
/**
 * Null object used for remote method calls because passing null around doesn't work
 * it needs it's own object
 * The serialVersionUID is to insure this class can be recompiled
 * and still be passed around without the remote end choking
 * because the serialVersionUID are different.
 */
public class NullObject implements Serializable { static final long serialVersionUID = 1333822856806054836L;

}
```

Class OutObject package com.VSDV.HTTPJDBC.Common;
import java.io.*;

```
public class OutObject implements Serializable{
  private String name;
  private Object result;
  public OutObject(String name, Object result) {
    this.name = name;
    this.result = result;
  } public String getName(){
    return name;
  }

// Result Object can be instanceof ResultSet, SQLException, Exception etc.
  public Object getResultObject(){
    return result;
  }
}
```

Server Side Classes

Class DBConnectionFactory ............................................................................... 2
Class DBVendor ............................................................................................... 3
Class JDBCServerConnection ........................................................................... 4
Class JDBCServerSession ................................................................................. 6
Class JDBCServlet ............................................................................................ 9
Class Oracle.java ............................................................................................ 15
Class ServerSessions ...................................................................................... 16
Class SQLServer ............................................................................................. 19

Class DBConnectionFactory

```
package com.VSDV.HTTPJDBC.Server;

import java.sql.*;
import java.util.*;

public class DBConnectionFactory {
  private DBConnectionFactory() {
  } public static Connection createConnection(Properties properties) throws
SQLException{
      String vendor = (String)properties.get("DBVENDOR");
      DBVendor dbVendor = null;
      if (vendor.equals("ORACLE")){
        dbVendor = new Oracle(properties);
      } else if (vendor.equals("SQLSERVER")){
        dbVendor = new SQLServer(properties);
      }
      if (dbVendor == null){
        throw new SQLException("Fatal error - No database vendor specified");
      }
      return dbVendor.createConnectionFromProperties();
    }
}
```

Class DBVendor package com.VSDV.HTTPJDBC.Server;

import java.sql.*;

```
public interface DBVendor {
  public Connection createConnectionFromProperties() throws SQLException;
}
```

Class JDBCServerConnection

```java
package com.VSDV.HTTPJDBC.Server;

import com.VSDV.VerticalSuite.*;
import javax.servlet.http.*;
import javax.servlet.*;
import java.sql.*;
import java.io.*;

public class JDBCServerConnection implements HttpSessionBindingListener{
  private Connection connection;
  private String connectionName;
  private ServletContext context;
  public JDBCServerConnection(String name, Connection connection, ServletContext context) {
    this.connection = connection;
    connectionName = name;
    this.context = context;
  } public void valueBound(HttpSessionBindingEvent e){
    HttpSession session = e.getSession();
    FileOutputStream file = (FileOutputStream)session.getAttribute(GenericLoginServlet.VSLOGFILE);
    try{
      if (file != null){
        String s = "Connection Made : "+connectionName;
        file.write(s.getBytes());
      }
    }catch(IOException ioe){
      ioe.printStackTrace();
    }
  }

// The following method does the following
// when the session is invalidated/timed out
// 1. db connection is closed.
// 2. removes this object from the session application layers data.
  public void valueUnbound(HttpSessionBindingEvent e){
    HttpSession session = e.getSession();
    context.log("Unbound : "+connectionName);
    try{
      connection.close();
    } catch(SQLException sqle){
      try {
        FileOutputStream file = (FileOutputStream)session.getAttribute(GenericLoginServlet.VSLOGFILE);
        if (file != null){
          String s = "********** Connection : "+connectionName+" Closed. ********";
          file.write(s.getBytes());
          sqle.printStackTrace(new PrintStream(file));
        }
      }catch(IOException ioe){
        ioe.printStackTrace();
        context.log(ioe.getMessage());
      }
```

```
    }
    // remove this from the current session
    ServerSessions sessions = JDBCServlet.getServerSessions();
    sessions.disposeSession(connectionName);
    session.removeAttribute(connectionName);
  }
}
```

Class JDBCServerSession package com.VSDV.HTTPJDBC.Server;

import java.io.*;
import java.util.*;
import javax.servlet.http.*;
import javax.servlet.*;
import java.sql.*;
import java.lang.reflect.*;

```
/**
 * Session used by servlet corresponding to LFRT Applet
 * client user loging session
 * Holds JDBC objects on behalf of the user
 */
public class JDBCServerSession implements Serializable {

ServletContext context;
  Driver driver;
  Hashtable hash;
  int objNameCounter=1;
  long lastRenewed;
  String sessionId;
  Vector objectNameIndex = new Vector();

public JDBCServerSession(ServletContext context) {
    this.context = context;
    hash = new Hashtable();
  } public void setSessionId(String id) {
    sessionId = id;
  } public String getSessionId() {
        return sessionId;
  } public long getLastRenewed() {
    return lastRenewed;
  }
```

```java
/**
 * Returns objects from session based on a name
 */
public Object getObject(String objectName) {
  return hash.get(objectName);
} public Object[] getObjects() {
  Object[] objects = new Object[hash.size()];
        Enumeration enum = hash.elements();
        int count = 0;
        while (enum.hasMoreElements() ) {
          objects[count] = (Object)enum.nextElement();
          count++;
  }
        return objects;
}

/**
 * Sets objects into the session based on a name
 */
public String setObject(Object obj) {
        String objectName = objNameCounter+"";
  hash.put(objectName, obj);
//    context.log(objectName+" setObject = "+ obj);
  objNameCounter++;
  objectNameIndex.addElement(objectName);
  return objectName;
}

/**
 * Renews keepalive or lease for this session so it
 * doesn't get killed
 */
public void renew() {
  lastRenewed = System.currentTimeMillis();
}

/**
 * Closes up all objects associated with this session
 */
public void close() {
  try {
    Enumeration enum = hash.elements();
    while (enum.hasMoreElements() ) {
      Object obj = enum.nextElement();
```

```
        closeObject(obj);
            }
        } catch (Exception ex) { ex.printStackTrace(); }
}

/**
 * Closes out JDBC objects when this session is tossed in the trash
 */
public void closeObject(Object obj, String objectName) {
        try {
    Class c = obj.getClass();
    Method method = c.getMethod("close", null);
    method.invoke(obj, null);
    hash.remove(objectName);
  } catch (Exception ex) {
            context.log("Error closing object "+obj.toString());
            }
} public void closeObject(Object obj) {
        try {
    Class c = obj.getClass();
    Method method = c.getMethod("close", null);
    method.invoke(obj, null);
    hash.remove(obj);
  } catch (Exception ex) {
            context.log("Error closing object "+obj.toString());
            }
}

}
```

Class JDBCServlet

```
package com.VSDV.HTTPJDBC.Server;

import javax.servlet.*;
import javax.servlet.http.*;
import java.io.*;
import java.util.*;
import java.lang.reflect.*;
import java.sql.*;
import com.VSDV.RowSet.*;

import com.VSDV.HTTPJDBC.Common.*;

public class JDBCServlet extends HttpServlet{ public static ServerSessions sessions;
  Driver poolDriver;
  Properties poolProps;
  ServletContext context;
  ServletConfig config;

public void init(ServletConfig config) throws ServletException {
    super.init(config);
        context = config.getServletContext();
        sessions = new ServerSessions(context);
    try {
      this.config = config;
      poolDriver = (Driver) Class.forName("weblogic.jdbc20.oci.Driver").newInstance();
    } catch (Exception ex) { context.log("", ex); }
  } public static ServerSessions getServerSessions() {
        return sessions;
  } public void doGet(HttpServletRequest req, HttpServletResponse res) throws
ServletException, IOException {
//    HttpSession session = req.getSession();
    String action = req.getParameterValues("action")[0];
    if (action.equals("renew") ) {
      String sessionId = req.getParameterValues("sessionid")[0];
      JDBCServerSession s = sessions.getSession(sessionId);
      s.renew();
        } else if (action.equals("createSession") ) {
```

```
    String sessionId = sessions.addSession(new JDBCServerSession(context));
    OutputStream out = res.getOutputStream();
    ObjectOutputStream objOut = new ObjectOutputStream(out);
    objOut.writeObject(sessionId);
    objOut.flush();
    objOut.close();
//     session.setAttribute(sessionId, new Session(sessionId, context));
        }
    } private void sendResultObject(HttpServletResponse res, Object resultObject) throws
IOException{
      OutputStream out = res.getOutputStream();
            ObjectOutputStream objOut = new ObjectOutputStream(out);
      objOut.writeObject(resultObject);
      objOut.flush();
      objOut.close();
    } public void doPost(HttpServletRequest req, HttpServletResponse res) throws
ServletException, IOException {
//      HttpSession session = req.getSession();
      Object returnValue=null, obj=null;
            context = config.getServletContext();
      Object inObject = null;
      try {
       InputStream in = req.getInputStream();
       ObjectInputStream objIn = new ObjectInputStream(in);
       inObject = objIn.readObject();
       objIn.close();
       if (inObject instanceof InObject){
         returnValue = executeCall((InObject)inObject, req);
       } else if(inObject instanceof MethodList){
         returnValue = executeMethods((MethodList)inObject, req);
       }
      } catch (InvocationTargetException ite) {
            returnValue = ite.getTargetException();
            context.log("InvocationTargetException", ite);
      } catch (RuntimeException re) {
       context.log("Null Pointer Exception", re);
      } catch (Exception ex) {
            returnValue = ex;
            context.log("Exception", ex);
            }
      if (returnValue == null){
       sendResultObject(res, new NullObject());
```

```java
    } else {
      try {
        sendResultObject(res, getReturnValue(returnValue));
      } catch(SQLException sqle){
        sendResultObject(res, sqle);
      }
    }
  }
} private String createConnection(InObject callObject, HttpServletRequest req) throws
SQLException, InvocationTargetException, NoSuchMethodException,
IllegalAccessException{
    Properties props = (Properties)callObject.parameters[1];
    java.sql.Connection con = DBConnectionFactory.createConnection(props);
    String connectionName = createObjectReference(callObject, con).toString();
//   setupConnectionTimeout(req, con, callObject.getSessionId());   // comment this line for local testing
    log("Connection Created");
    return connectionName;
  } private void setupConnectionTimeout(HttpServletRequest req, java.sql.Connection
connection, String sessionId){
    log("***************************************** Setting up Connection Timeout
********************");
    HttpSession session = req.getSession();
    session.setAttribute(sessionId,new JDBCServerConnection(sessionId, connection,
getServletContext()));
  } private Object executeCall(InObject callObject, HttpServletRequest req) throws
SQLException, InvocationTargetException, NoSuchMethodException,
IllegalAccessException{
    Object obj = null, returnValue = null;
    JDBCServerSession serverSession =
(JDBCServerSession)sessions.getSession(callObject.getSessionId() );
    String objectName = callObject.getObjectName();
    if (objectName.equals("driver") ) {
      returnValue = createConnection(callObject, req);  // Currently this is called when
driver.connect() is called Need to implement other methods getMinorVersion etc. if
required.
    } else if (objectName.equals("connection") ) {
      obj = serverSession.getObject("connection");
      Object methodCallReturnObject = executeMethodOnObject(obj, callObject);
      returnValue = createObjectReference(callObject, methodCallReturnObject);
```

```
} else if (serverSession != null) {
  obj = serverSession.getObject(objectName);
  Object methodCallReturnObject = executeMethodOnObject(obj, callObject);
  returnValue = createObjectReference(callObject, methodCallReturnObject);
}
if (returnValue == null){
  return new NullObject();
}
return returnValue;
} public Object executeMethods(MethodList methodList, HttpServletRequest req) throws
SQLException, InvocationTargetException, IllegalAccessException,
NoSuchMethodException{
  Iterator iterator = methodList.iterator();
  Object returnValue = null;
  Object objectToExecuteMethodsOn = null;
  String objectName = methodList.getName();
  while (iterator.hasNext()){
    InObject inObject = (InObject)iterator.next();
    try{
      if (objectName == null){
        objectName = (String)executeCall(inObject, req);
        methodList.setName(objectName);
      } else{
        inObject.objectName = objectName;
        objectToExecuteMethodsOn = getObjectByName(inObject);
        Object methodReturnValue =
executeMethodOnObject(objectToExecuteMethodsOn, inObject);
        if (methodReturnValue != null){
          returnValue = getReturnValue(methodReturnValue);
        }
      }
    } catch(NoSuchMethodException nsme){
      context.log("Exception : ",nsme);
    }
  }
  returnValue = getReturnValue(returnValue); // if the return value is a ResultSet then
we need to create a cachedRowSet from that
  return new OutObject(objectName, returnValue);
} private Object getReturnValue(Object returnValue) throws SQLException{
  if (returnValue == null){
    return new NullObject();
  }
```

```
if (returnValue instanceof ResultSet) {
  CachedRowSet crs = new CachedRowSet();
  crs.populate((ResultSet)returnValue);
  ResultSet rset = (ResultSet)returnValue;
  rset.close();
  return crs;
}
return returnValue;
} private Object executeMethodOnObject(Object object, InObject inObject) throws
NoSuchMethodException, InvocationTargetException, IllegalAccessException{
  Object returnValue = null;
  if (inObject.getMethodName().equals("close") ) {
    JDBCServerSession session = sessions.getSession(inObject.getSessionId());
        session.closeObject(object, inObject.getObjectName());
    return new NullObject();
        }
  inObject.createInputStreamFromBytes();
        Class calledObjectClass = object.getClass();
    Class[] pmtypes = inObject.getParameterTypes();
        Method method = calledObjectClass.getMethod(inObject.getMethodName(),
pmtypes );
  returnValue = method.invoke(object, inObject.getParameters());
  return returnValue;
} private Object executeMethodsOnObject(Iterator inObjects, Object
objectToExecuteMethodsOn) throws NoSuchMethodException,
InvocationTargetException, IllegalAccessException{
  Object returnValue = null;
  while (inObjects.hasNext()){
    InObject inObject = (InObject)inObjects.next();
    returnValue = executeMethodOnObject(objectToExecuteMethodsOn, inObject);
  }
  return returnValue;
} private Object getObjectByName(InObject inObject){
  JDBCServerSession serverSession =
(JDBCServerSession)sessions.getSession(inObject.getSessionId());
  return serverSession.getObject(inObject.objectName);
} private Object createObjectReference(InObject inObject, Object referenceObject)
throws SQLException, InvocationTargetException, IllegalAccessException{
```

```
  JDBCServerSession serverSession =
(JDBCServerSession)sessions.getSession(inObject.getSessionId());
    String methodName = inObject.getMethodName();
    if ( methodName.equals("createStatement") ||
methodName.equals("prepareStatement")
       || methodName.equals("prepareCall") || methodName.equals("getMetaData")
       || methodName.equals("connect")) {
      return serverSession.setObject(referenceObject);
    }
    return referenceObject;
  }
} class Session implements HttpSessionBindingListener{
  private String id;
  private ServletContext context;
  public Session(String id, ServletContext context){
    this.id = id;
    this.context = context;
  } public void valueBound(HttpSessionBindingEvent e){
    // do nothing, cos we would just create the object
    context.log("********** Bound : "+id+" *****************");
  } public void valueUnbound(HttpSessionBindingEvent e){
    // when the sesion dies, delete it from the hash table, and all the
    // objects owned by that session should theoretically die.
    // context.log("Unbound Session : "+id);
    context.log("********** Unbound : "+id+" *****************");
    JDBCServlet.getServerSessions().disposeSession(id);
  }
}
```

Class Oracle.java package com.VSDV.HTTPJDBC.Server;

import java.util.*;
import java.sql.*;

```java
public class Oracle implements DBVendor{
  private final String dbDriver = "weblogic.jdbc20.oci.Driver";
  Properties properties;
  public Oracle(Properties properties) {
    this.properties = properties;
  } public Connection createConnectionFromProperties() throws SQLException{
    try{
      Driver driver = (Driver) Class.forName(dbDriver).newInstance();
      // for oracle oci connections the value of server should be one of
      // the tnsnames entries, but this will be the values of db parameter
      // so this needs to be changed and all we need
      // is user, password, server.
      Properties props = new Properties();
      props.put("user", properties.get("user"));
      props.put("password", properties.get("password"));
      props.put("server", properties.get("db"));
      Connection connection = driver.connect("jdbc20:weblogic:oracle", props);
      return connection;
    } catch(ClassNotFoundException cnfe){
      throw new SQLException("Fatal Error - Suitable driver class not found for Oracle");
    } catch(IllegalAccessException iae){
      throw new SQLException("Fatal Error - Illegal access exception while trying to load driver for Oracle");
    } catch(InstantiationException ie){
      throw new SQLException("Fatal Error - Cannot instantiate driver for Oracle");
    }
  }
}
```

Class ServerSessions package com.VSDV.HTTPJDBC.Server;

import java.util.*;
import java.awt.event.*;
import javax.swing.Timer;
import javax.servlet.*;

```java
/**
 * Holds JDBCServerSession objects for the servlet
 */
public class ServerSessions {

Hashtable hash;

int counter=0;
    long time = System.currentTimeMillis();
    int secondsTillKill = 30;
    Timer timer;
    ServletContext context;

public ServerSessions(ServletContext context) {
            this.context = context;
        hash = new Hashtable();
// diabling sessions
//   timer = new Timer(1000*10, new TimerListener() );
//        timer.start();
    }

/**
     * Periodically runs and cleans up session that
     * have not been renewed lately
     */
    public class TimerListener implements ActionListener {
            public void actionPerformed(ActionEvent evt) {
              try {
            disposeOldSessions();

} catch (Exception ex) {
                ex.printStackTrace();
            }
        }
```

```
public JDBCServerSession[] getSessions() {
  JDBCServerSession[] sessions = new JDBCServerSession[hash.size()];
  Enumeration enum = hash.elements();
  int count = 0;
  while (enum.hasMoreElements() ) {
    sessions[count] = (JDBCServerSession)enum.nextElement();
    count++;
    }
      return sessions;
}

/**
 * Tosses old sessions
 */
private void disposeOldSessions() {
  Enumeration enum = hash.keys();
  while (enum.hasMoreElements() ) {
        String key = (String)enum.nextElement();

JDBCServerSession session = (JDBCServerSession)hash.get(key);
    long lastRenewed = session.getLastRenewed();
    long currentTime = System.currentTimeMillis();
    long difference = currentTime - lastRenewed;

if ( difference > (1000*secondsTillKill) ) {
      hash.remove(key);
      session.close();
//      context.log("removed session "+key );
  //    context.log("difference = "+ difference);
    }
        }
}

/**
 * Adds session to collection
 */
public String addSession(JDBCServerSession obj) {
  counter++;
  String sessionId = time+counter+"";
  hash.put(sessionId, obj);
  obj.setSessionId(sessionId);
  return sessionId;
}
```

```
/**
 * Get session out of collection based on the sessionId
 */
public JDBCServerSession getSession(String sessionId) {
  return (JDBCServerSession)hash.get(sessionId);
} public void disposeSession(String sessionID){
  JDBCServerSession session = getSession(sessionID);
//   context.log("Closing off objects for session : "+sessionID);
  session.close();
  hash.remove(sessionID);
 }
}
```

Class SQLServer package com.VSDV.HTTPJDBC.Server;

import java.util.*;
import java.sql.*;

```java
public class SQLServer implements DBVendor {
  private String driverClass = "weblogic.jdbc.mssqlserver4.Driver";
  private Properties properties;
  public SQLServer(Properties props) {
    this.properties = props;
  } public Connection createConnectionFromProperties() throws SQLException{
    try{
      Driver driver = (Driver) Class.forName(driverClass).newInstance();
      Connection connection = driver.connect("jdbc:weblogic:mssqlserver4", properties);
      return connection;
    } catch(ClassNotFoundException cnfe){
      throw new SQLException("Fatal Error - Suitable driver class not found for SQLServer");
    } catch(IllegalAccessException iae){
      throw new SQLException("Fatal Error - Illegal access exception while trying to load driver for SQLServer");
    } catch(InstantiationException ie){
      throw new SQLException("Fatal Error - Cannot instantiate driver for SQLServer");
    }
  }
}
```

The invention claimed is:

1. An apparatus for accessing data from a database through a security mechanism, the database being accessible to a database access port, the security mechanism allowing access through a security access port, the apparatus comprising:
   a first application configured to be executed on a client computer;
   one or more proxy objects being generated in response to commands from the first application,
      the proxy objects requesting data from a database;
   one or more drivers configured to be stored on a server computer; and
   a second application configured to be executed on a server computer separated from the first application by the security mechanism,
      the second application receiving the proxy objects from the first application, generating a database query based on the proxy objects and the drivers and returning the database query results to the first application,
   wherein the first application is configured to detect a request to pass the proxy objects through the database access port, and
      to switch passage of the proxy objects to the security access port, and
   wherein the second application is configured to return database query results to the first application through the security access port.

2. The apparatus of claim 1, wherein the first and second applications are Java language applications.

3. The apparatus of claim 2, wherein the first application comprises an applet.

4. The apparatus of claim 3, wherein the second application comprises a servlet.

5. The apparatus of claim 4 further comprising an application server that executes the servlet.

6. The apparatus of claim 5 further comprising a database server that contains the data being accessed by the application server wherein the database server and the application server are located in different geographic areas.

7. The apparatus of claim 6 further comprising a communications network that permits the client, the application server and the database server to communicate data with each other and wherein the data communications between the client and application server occur using the hypertext transfer protocol (HTTP) that is transmitted by the security mechanism.

8. The apparatus of claim 7, wherein the data communications between the client and the application server occur over port 80.

9. The apparatus of claim 8, wherein the one or more database drivers further comprise one or more JDBC drivers.

10. The apparatus of claim 6, wherein the application server further comprises means for batching one or more database requests from the client computer so that the batch of database requests are sent periodically to the database server.

11. A method for accessing data located behind a security mechanism, comprising:
   executing a first application on a client computer that generates one or more proxy objects;
   communicating the proxy objects to a second application on an application server;
   generating one or more database requests at the application server based on the proxy objects, the database requests being generated using database drivers;
   redirecting the one or more database requests through a security access port of the security mechanism;
   forwarding the database requests to a database;
   returning the data from the database to the application server; and
   providing the data back to the client computer using the proxy objects.

12. The method of claim 11, wherein the first and second set of applications are Java language applications.

13. The method of claim 12, wherein executing the first application further comprises executing a Java applet.

14. The method of claim 13 further comprising executing the second set of applications on the application server that process the proxy objects from the client computer, wherein the second set of applications comprises servlets.

15. The method of claim 14 further comprising accessing the database using a database server that contains the data being accessed by the application server wherein the database server and the application server are located in different geographic areas.

16. The method of claim 15, wherein the communications between the client computer and the application server uses the hypertext transfer protocol (HTTP) that is transmitted by the security mechanism.

17. The method of claim 16, wherein the communications between the client and the application server occur over port 80.

18. The method of claim 17, wherein the one or more database drivers further comprise one or more JDBC drivers.

19. The method of claim 15 further comprises batching one or more database requests from the client computer at the application server so that the batch of database requests are sent periodically to the database server.

20. A system for accessing data located behind a security mechanism, comprising:
   a client having means for generating one or more database proxy objects in response to a database request;
   an application server comprising means for processing the received database proxy objects and means for using one or more drivers to generate one or more database requests based on the database proxy objects;
   wherein the one or more database requests are redirected through a security access port of the security mechanism, and
   wherein the client interacts with the database through the application server so that the security mechanism protecting the application server does not interrupt the accessing of the data in the database.

21. The system of claim 20, wherein the generating means and the processing means are Java language applications.

22. The system of claim 21, wherein the generating means further comprises an applet.

23. The system of claim 22, wherein the processing means further comprises a set of servlets.

24. The system of claim 23 further comprising means for storing the database that contains the data being accessed by the application server wherein the database server and the application server are located in different geographic areas.

25. The system of claim 24 further comprising means for communicating between the client, the application server and the database server to communicate data with each other and wherein the data communications between the client and application server occur using the hypertext transfer protocol (HTTP) that is transmitted by the security mechanism.

26. The system of claim 25, wherein the data communications between the client and the application server occur over port 80.

27. The system of claim 26, wherein the one or more database drivers further comprise one or more JDBC drivers.

28. The system of claim 24, wherein the application server further comprises means for batching one or more database requests from the client computer so that the batch of database requests are sent periodically to the database server.

29. A system for accessing data by a Java applet wherein the data is located behind a security mechanism, the system comprising:
- a client that executes a Java applet having a series of instructions that include accessing data from a database, the client further comprising one or more database proxy objects that are generated by the Java applet in response to a database request;
- an application server that executes a servlet that interact with the database proxy objects and generates one or more objects corresponding to the database proxy objects, the application server further comprising one or more JDBC drivers that are integrated into the objects generated by the servlets wherein the JDBC drivers interface with a database so that the application server requests data from the database;
- wherein the database proxy objects are redirected though a security access port of the security mechanism and
- wherein the applet interacts with the database through the application server so that the security mechanism protecting the client does not interrupt the accessing of the data in the database.

30. A system for accessing data located behind a security mechanism, comprising:
- a client that executes a first application having a series of instructions that includes accessing data from a database, the client further comprising one or more database proxy objects;
- an application server that executes one or more second applications that interact with the database proxy objects and have one or more corresponding objects, the application server further comprising one or more drivers that interface with a database so that the application server requests data from the database;
- wherein the database proxy objects are redirected through a security access port of the security mechanism and
- wherein the client interacts with the database through the application server so that the security mechanism protecting the client does not interrupt the accessing of the data in the database.

31. The system of claim 30, wherein the first and second set of applications are Java language applications.

32. The system of claim 31, wherein the first application comprises an applet.

33. The system of claim 31, wherein the second set of applications comprises a set of servlets.

34. The system of claim 33 further comprising a database server that contains the data being accessed by the application server wherein the database server and the application server are located in different geographic areas.

35. The system of claim 34 further comprising a communications network that permits the client, the application server and the database server to communicate data with each other and wherein the data communications between the client and application server occur using the hypertext transfer protocol (HTTP) that is transmitted by the security mechanism.

36. The system of claim 35, wherein the data communications between the client and the application server occur over port 80.

37. The system of claim 36, wherein the one or more database drivers further comprise one or more JDBC drivers.

38. The system of claim 34, wherein the application server further comprises means for batching one or more database requests from the client computer so that the batch of database requests are sent periodically to the database server.

* * * * *